(12) United States Patent
Yonezawa et al.

(10) Patent No.: US 9,450,244 B2
(45) Date of Patent: Sep. 20, 2016

(54) CATHODE ACTIVE MATERIAL WITH ZIRCONIUM IN CRYSTAL GRAIN BOUNDARY OF LITHIUM COBALT COMPLEX OXIDE

(75) Inventors: Kei Yonezawa, Tokyo (JP); Takashi Sato, Fukushima (JP); Tsuyoshi Okawa, Fukushima (JP); Yoshikatsu Yamamoto, Fukushima (JP)

(73) Assignee: Sony Corporation, Tokyo (JP)

( * ) Notice: Subject to any disclaimer, the term of this patent is extended or adjusted under 35 U.S.C. 154(b) by 1423 days.

(21) Appl. No.: 11/908,079

(22) PCT Filed: Mar. 28, 2006

(86) PCT No.: PCT/JP2006/304445
§ 371 (c)(1),
(2), (4) Date: Sep. 7, 2007

(87) PCT Pub. No.: WO2006/095760
PCT Pub. Date: Sep. 14, 2006

(65) Prior Publication Data
US 2009/0004567 A1    Jan. 1, 2009

(30) Foreign Application Priority Data

Mar. 9, 2005 (JP) .................................. 2005-066408
Dec. 7, 2005 (JP) .................................. 2005-353849

(51) Int. Cl.
*H01M 4/13* (2010.01)
*H01M 4/525* (2010.01)
(Continued)

(52) U.S. Cl.
CPC ............. *H01M 4/525* (2013.01); *H01M 4/38* (2013.01); *H01M 10/0436* (2013.01);
(Continued)

(58) Field of Classification Search
CPC ............... H01M 10/0436; H01M 10/0525; H01M 10/0569; H01M 10/0587; H01M 10/4235; H01M 2004/028; H01M 2010/4292; H01M 2300/0037; H01M 4/131; H01M 4/133; H01M 4/38; H01M 4/485; H01M 4/505; H01M 4/525; Y02E 60/122
See application file for complete search history.

(56) References Cited

U.S. PATENT DOCUMENTS 6,720,112 B2 * 4/2004 Barker ................. C01G 23/003
423/594.1
6,805,996 B2  10/2004 Hosoya
(Continued)

FOREIGN PATENT DOCUMENTS

JP    2001-319652    11/2001
JP    2002-203553    7/2002
(Continued)

OTHER PUBLICATIONS

International Search Report dated Jun. 13, 2006.

*Primary Examiner* — Patrick Ryan
*Assistant Examiner* — Ben Lewis
(74) *Attorney, Agent, or Firm* — Sheridan Ross P.C.

(57) ABSTRACT

A battery capable of improving load characteristics, low-temperature characteristics and high-temperature cycle characteristics is provided. A cathode (13) includes a lithium cobalt complex oxide represented by $Li_aCo_xMI_yMII_zO_2$ (MI includes at least one kind selected from the group consisting of Al, Cr, V, Mn and Fe, MII includes at least one kind selected from the group consisting of Mg and Ca, $0.9 \leq a \leq 1.1$, $0.9 \leq x < 1$, $0.001 \leq y \leq 0.05$, $0.001 \leq z \leq 0.05$, $x+y+z=1$), and further includes Zr as a sub-component element. The content of Zr is within a range from 0.01 mol % to 10 mol % both inclusive as a ratio (Zr/Co) of Zr to Co in the lithium cobalt complex oxide.

14 Claims, 9 Drawing Sheets

(51) Int. Cl.
  *H01M 4/38* (2006.01)
  *H01M 10/04* (2006.01)
  *H01M 10/0525* (2010.01)
  *H01M 10/0569* (2010.01)
  *H01M 10/0587* (2010.01)
  *H01M 10/42* (2006.01)
  *H01M 4/131* (2010.01)
  *H01M 4/133* (2010.01)
  *H01M 4/485* (2010.01)
  *H01M 4/505* (2010.01)
  *H01M 4/02* (2006.01)

(52) U.S. Cl.
  CPC ... *H01M 10/0525* (2013.01); *H01M 10/0569* (2013.01); *H01M 10/0587* (2013.01); *H01M 10/4235* (2013.01); *H01M 4/131* (2013.01); *H01M 4/133* (2013.01); *H01M 4/485* (2013.01); *H01M 4/505* (2013.01); *H01M 2004/028* (2013.01); *H01M 2010/4292* (2013.01); *H01M 2300/0037* (2013.01); *Y02E 60/122* (2013.01)

(56) References Cited

U.S. PATENT DOCUMENTS

| | | | |
|---|---|---|---|
| 2002/0037456 A1* | 3/2002 | Hosoya | H01M 4/382 429/231.3 |
| 2003/0134200 A1 | 7/2003 | Tanaka | |
| 2004/0229123 A1 | 11/2004 | Takahashi | |
| 2004/0229124 A1* | 11/2004 | Miyamoto | H01M 10/0525 429/231.1 |
| 2006/0078795 A1* | 4/2006 | Takahashi | H01M 4/131 429/231.3 |

FOREIGN PATENT DOCUMENTS

| | | |
|---|---|---|
| JP | 2004-311408 | 11/2004 |
| JP | 2005-050779 | 2/2005 |
| JP | 2005-129489 | 5/2005 |
| JP | 2005-190900 | 7/2005 |
| JP | 2005-285720 | 10/2005 |
| JP | 2005-317499 | 11/2005 |

* cited by examiner

CATHODE ACTIVE MATERIAL WITH ZIRCONIUM IN CRYSTAL GRAIN BOUNDARY OF LITHIUM COBALT COMPLEX OXIDE

TECHNICAL FIELD

The present invention relates to a cathode active material including a lithium cobalt complex oxide which includes lithium (Li) and cobalt (Co), and a battery using the same.

BACKGROUND ART

In recent years, portable electronic devices have been developed one after another, and as power sources for the portable electronic devices, secondary batteries have been playing a key role. In particular, recently, a secondary battery with a higher capacity and a lighter weight has been demanded, and as a secondary battery meeting such a demand, a lithium secondary battery using lithium as an electrode reactant has been put to practical use.

As a cathode active material of the lithium secondary battery, lithium cobalt oxide ($LiCoO_2$) is widely used. It is because lithium cobalt oxide has a layer structure which is advantageous to diffuse lithium ions, and the structure is stable for insertion and extraction of lithium ions, so high characteristics can be obtained. However, in recent years, there has been a demand for the use of the lithium secondary battery in a wider temperature range or the use of the lithium secondary battery with a high current; therefore, demands for characteristics have become more difficult.

Therefore, a large number of attempts to improve characteristics by substituting another element for cobalt in the lithium cobalt oxide, or adding another element have been made. For example, Patent Literature 1 discloses a cathode active material capable of improving stability at high temperature by substituting a first element being at least one kind selected from the group consisting of aluminum (Al), chromium (Cr), vanadium (V), manganese (Mn) and iron (Fe) and a second element being at least one kind selected from the group consisting of magnesium (Mg) and calcium (Ca) for a part of cobalt. Moreover, Patent Literature 2 discloses a cathode active material capable of improving load characteristics, low-temperature characteristics and thermal stability by coprecipitating a zirconium compound at the time of synthesizing lithium cobalt oxide so that zirconium (Zr) is present on particle surfaces of lithium cobalt oxide.

[Patent Literature 1] Japanese Unexamined Patent Application Publication No. 2001-319652
[Patent Literature 2] Japanese Unexamined Patent Application Publication No. 2004-311408

DISCLOSURE OF THE INVENTION

However, in a cathode active material described in Patent Literature 1, high-temperature characteristics can be improved; however, satisfactory load characteristics and satisfactory low-temperature characteristic cannot be obtained, and further improvement in cycle characteristics is demanded. Moreover, in a cathode active material described in Patent Literature 2, thermal stability can be improved; however, characteristics at a level demanded in recent years cannot be obtained.

In view of the foregoing, it is an object of the invention to provide a cathode active material and a battery capable of improving load characteristics, low-temperature characteristics and cycle characteristics at high temperature.

A cathode active material according to the invention includes a lithium cobalt complex oxide including lithium, cobalt, a first element and a second element, wherein the first element is at least one kind selected from the group consisting of aluminum, chromium, vanadium, manganese and iron, the second element is at least one kind selected from the group consisting of magnesium and calcium, the molar ratios of cobalt, the first element and the second element in the lithium cobalt complex oxide are within ranges of $0.9 \le x < 1$, $0.001 \le y \le 0.05$ and $0.001 \le z \le 0.05$, respectively, providing that the composition of cobalt is x, the composition of the first element is y, and the composition of the second element is z, the cathode active material further includes zirconium as a sub-component element, and the content of zirconium is within a range from 0.01 mol % to 10 mol % both inclusive as a ratio (Zr/Co) of zirconium to cobalt in lithium cobalt complex oxide.

A battery according to the invention includes a cathode, an anode and an electrolyte, wherein the cathode includes a cathode active material including a lithium cobalt complex oxide, the lithium cobalt complex oxide includes lithium, cobalt, a first element and a second element, the first element is at least one kind selected from the group consisting of aluminum, chromium, vanadium, manganese and iron, the second element is at least one kind selected from the group consisting of magnesium and calcium, the molar ratios of cobalt, the first element and the second element in the lithium cobalt complex oxide are within ranges of $0.9 \le x < 1$, $0.001 \le y \le 0.05$ and $0.001 \le z \le 0.05$, respectively, providing that the composition of cobalt is x, the composition of the first element is y, and the composition of the second element is z, the cathode active material further includes zirconium as a sub-component element, and the content of zirconium is within a range from 0.01 mol % to 10 mol % both inclusive as a ratio (Zr/Co) of zirconium to cobalt in lithium cobalt complex oxide.

In the cathode active material according to the invention, the lithium cobalt complex oxide including a predetermined amount of the first element and a predetermined amount of the second element is included, and a predetermined amount of zirconium is included as a sub-component element, so the stability of the crystal structure can be further improved. Therefore, in the battery according to the invention, load characteristics and low-temperature characteristics can be improved, and cycle characteristics at high temperature can be improved. Moreover, even if the open circuit voltage in a fully charged state is increased, superior cycle characteristics can be obtained.

In particular, when the particle size of the cathode active material at a frequency of 50% in a particle size distribution curve is within a range from 5 μm to 30 μm both inclusive, and the specific surface area of the cathode active material is within a range from 0.1 $m^2$/g to 1.5 $m^2$/g both inclusive, higher effects can be obtained.

BEST MODE FOR CARRYING OUT THE INVENTION

Figure 1:
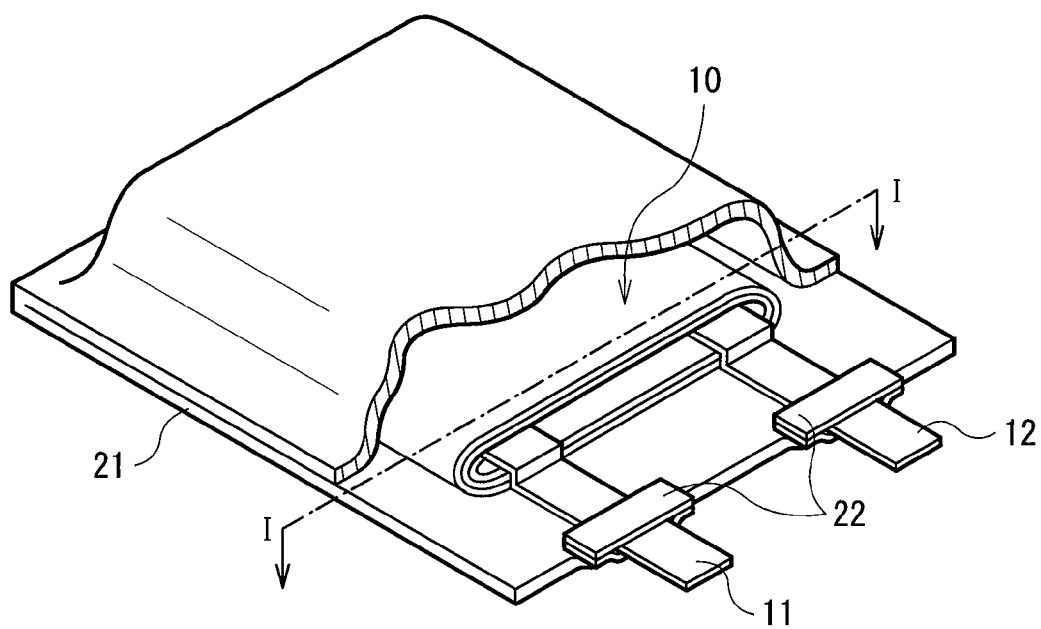
FIG. 1 is a partial sectional perspective view showing the configuration of a secondary battery according to an embodiment of the invention.

A preferred embodiment will be described in detail below referring to the accompanying drawings.

A cathode active material according to an embodiment of the invention has a particle shape, and includes a lithium cobalt complex oxide including lithium and cobalt. The lithium cobalt complex oxide includes a first element being at least one kind selected from the group consisting of aluminum, chromium, vanadium, manganese and iron in addition to the lithium and cobalt. It is because the first element has a large binding energy with oxygen, so its crystal structure in a state in which lithium is removed can be well maintained. Moreover, the lithium cobalt complex oxide includes a second element being at least one kind selected from the group consisting of magnesium and calcium. It is because when the second element is included, electron conductivity can be improved.

The molar ratios of cobalt, the first element and the second element in the lithium cobalt complex oxide are preferably within ranges of $0.9 \leq x < 1$, $0.001 \leq y \leq 0.05$ and $0.001 \leq z \leq 0.05$, respectively, providing that the composition of cobalt is x, the composition of the first element is y, and the composition of the second element is z. It is because when the content of the first element is too large, the diffusion of lithium ions in crystal is inhibited, and when the content of the second element is too large, the collapse of the crystal structure is promoted.

The chemical formula of the lithium cobalt complex oxide is represented by, for example, Chemical Formula 1.

$$Li_aCo_xMI_yMII_zO_2 \quad \text{(Chemical Formula 1)}$$

(In Chemical Formula 1, MI represents the first element, MII represents the second element, the values of a, x, y and z are within ranges of $0.9 \leq a \leq 1.1$, $0.9 \leq x < 1$, $0.001 \leq y \leq 0.05$, $0.001 \leq z \leq 0.05$, $x+y+z=1$)

Moreover, the cathode active material includes zirconium as a sub-component element. At least a part of zirconium is present in the crystal grain boundary of the lithium cobalt complex oxide, for example, as a constituent of a compound such as zirconium oxide or lithium zirconate. Thereby, the crystal structure of the lithium cobalt complex oxide can be more stabilized. In addition, a part of zirconium may form a solid solution in the lithium cobalt complex oxide, or may be present on the surfaces of particles of the lithium cobalt complex oxide.

The content of zirconium as the ratio (Zr/Co) of zirconium to cobalt in the lithium cobalt complex oxide is preferably within a range from 0.01 mol % to 10 mol % both inclusive. It is because when the content of zirconium is too small, sufficient effects cannot be obtained, and when it is too large, the capacity is reduced.

The particle size of the cathode active material at a frequency of 50% in a particle size distribution curve is preferably within a range from 5 μm to 30 μm both inclusive. It is because when the particle size is too small, it is difficult to handle the cathode active material, and when it is too large, a volume density at the time of forming an electrode is increased, thereby load characteristics and low-temperature characteristics decline. Moreover, the specific surface area of the cathode active material is preferably within a range from 0.1 $m^2/g$ to 1.5 $m^2/g$ both inclusive. It is because when the specific surface area is too small, reactivity declines, thereby load characteristics and low-temperature characteristics deline, and when it is too large, reactivity becomes too high, thereby a side reaction vigorously occurs.

The cathode active material can be obtained, for example, by adding an alkali solution such as sodium hydrogen carbonate to an acid solution in which a cobalt compound such as cobalt sulfate and a zirconium compound such as zirconium sulfate are dissolved, and coprecipitating zirconium together with a cobalt compound such as cobalt carbonate, and then mixing the cobalt compound such as cobalt carbonate, a lithium compound such as lithium carbonate, a compound including the first element, and a compound including the second element to form a mixture, and firing the mixture.

FIG. 1 shows the configuration of a secondary battery according to an embodiment of the invention using the cathode active material. The secondary battery has a configuration in which a battery element 10 to which a cathode lead 11 and an anode lead 12 are attached is contained in a film-shaped package member 21.

The cathode lead 11 and the anode lead 12 each have, for example, a strip shape, and they are drawn from the interiors of the package member 21 to outside, for example, in the same direction. The cathode lead 11 is made of, for example, a metal material such as aluminum, and the anode lead 12 is made of, for example, a metal material such as nickel (Ni).

The package member 21 has, for example, a configuration in which an insulating layer, a metal layer and an outermost layer are laminated in this order, and are bonded together by a laminating process. Edge parts of the package member 21 are adhered each other by fusion bonding or an adhesive so that the insulating layer is disposed inside.

The insulating layer is made of, for example, a polyolefin resin such as polyethylene, polypropylene, modified polyethylene, modified polypropylene or a copolymer thereof. It is because moisture permeability can be reduced, and hermeticity is superior. The metal layer is made of a foil-shaped or plate-shaped aluminum, stainless, nickel, iron or the like. The outermost layer may be made of, for example, the same resin as that of the insulating layer, or nylon or the like. It is because resistance to fracture, stabbing or the like can be increased. The package member 21 may include any other layer in addition to the insulating layer, the metal layer and the outermost layer.

An adhesive film 22 for improving adhesion between the cathode lead 11 and the anode lead 12 and the inside of the package member 21 and preventing the entry of outside air is inserted between the package member 21, and the cathode lead 11 and the anode lead 12. The adhesive film 22 is made of a material having adhesion to the cathode lead 11 and the anode lead 12, and, for example, in the case where the cathode lead 11 and the anode lead 12 are made of the above-described materials, the adhesive film 22 is preferably made of a polyolefin resin such as polyethylene, polypropylene, modified polyethylene or modified polypropylene.

Figure 2:
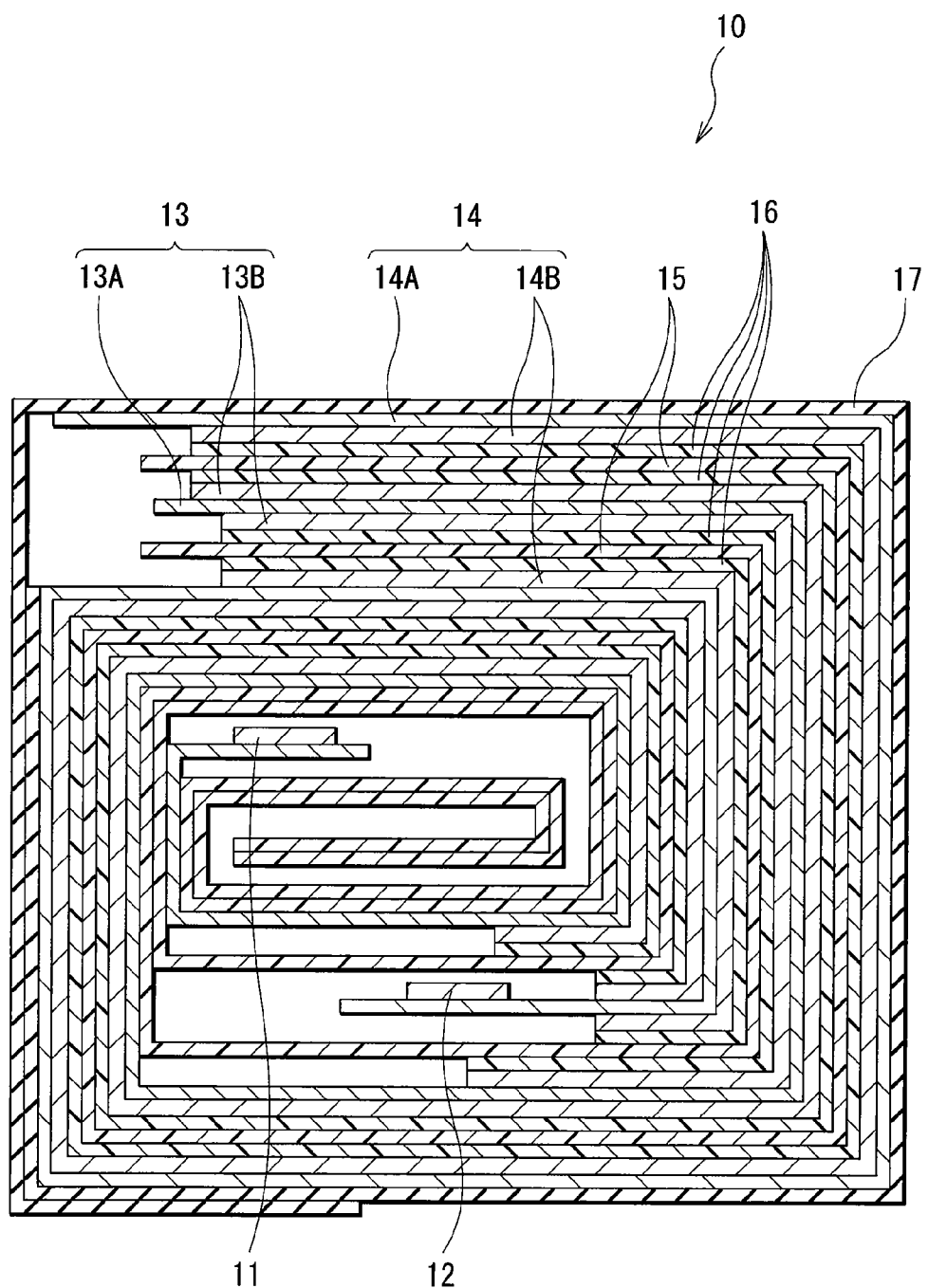
FIG. 2 is a sectional view showing a battery element taken along a line I-I of FIG. 1.

FIG. 2 shows a sectional configuration of the battery element 10 taken along a line I-I of FIG. 1. The battery element 10 is a spirally wound laminate including a pair of a cathode 13 and an anode 14 with a separator 15 and an electrolyte 16 in between, and an outermost part of the spirally wound laminate is protected with a protective tape 17.

The cathode 13 includes, for example, a cathode current collector 13A and a cathode active material layer 13B arranged on both sides of the cathode current collector 13A. The cathode current collector 13A is made of, for example, metal foil such as aluminum foil, and the cathode lead 11 is attached to an end of the cathode current collector 13A.

The cathode active material layer 13B includes the cathode active material according to the embodiment, and if necessary, the cathode active material layer 13B may include an electrical conductor such as a carbon material and a binder such as polyvinylidene fluoride or polytetrafluoroethylene. Thereby, in the secondary battery, the crystal structure of the cathode active material becomes more stable, and the load characteristics and the low-temperature characteristics can be improved, and cycle characteristics at high temperature can be improved. The composition a of lithium shown in Chemical Formula 1 is a composition during assembling, that is, at the time of fully discharging.

Moreover, the cathode active material layer 13B may include any other cathode active material in addition to the cathode active material according to the embodiment. Examples of the other cathode active material include a lithium nickel complex oxide including lithium and nickel, a lithium manganese complex oxide with a spinel structure including lithium and manganese, a phosphate compound including lithium and iron. For example, the lithium nickel complex oxide preferably includes cobalt in addition to lithium and nickel, and more preferably further includes the first element of the above-described lithium cobalt complex oxide. However, the ratio of the cathode active material according to the embodiment is preferably 10 wt % of the whole cathode active material. It is because higher characteristics can be obtained.

The volume density of the cathode active material layer 13B is preferably within a range from 2.0 g/cm$^3$ to 4.0 g/cm$^3$ both inclusive. It is because when the volume density is too small, a capacity per unit volume is reduced, and when the volume density is too large, permeability of the electrolyte 16 declines, and the load characteristics and the low-temperature characteristics decline.

As in the case of the cathode 13, the anode 14 includes, for example, an anode current collector 14A and an anode active material layer 14B arranged on both sides of the anode current collector 14A. The anode current collector 14A is made of, for example, metal foil such as copper foil, and the anode lead 12 is attached to an end of the anode current collector 14A.

The anode active material layer 14B includes one kind or two or more kinds of materials capable of inserting and extracting lithium, and if necessary, the anode active material layer 14B may include an electrical conductor and a binder. In the secondary battery, the charge capacity of an anode material capable of inserting and extracting lithium is larger than the charge capacity of the cathode 13, thereby the precipitation of lithium metal on the anode during charge is prevented.

Examples of the anode material capable of inserting and extracting lithium include carbon materials such as graphite, non-graphitizable carbon and graphitizable carbon. One kind or a mixture of two or more kinds selected from the carbon materials may be used, or a mixture of two or more kinds of carbon materials with different average particle sizes may be used.

As the anode material capable of inserting and extracting lithium, a material including a metal element or a metalloid element capable of forming an alloy with lithium as an element is cited. More specifically, a simple substance, an alloy or a compound of a metal element or a metalloid element, or a material including a phase including one kind or two or more kinds of them at least in part is cited.

Examples of such a metal element or a metalloid element include tin (Sn), lead (Pb), aluminum, indium (In), silicon (Si), zinc (Zn), antimony (Sb), bismuth (Bi), cadmium (Cd), magnesium, boron (B), gallium (Ga), germanium (Ge), arsenic (As), silver (Ag), zirconium, yttrium (Y) and hafnium (Hf). Among them, a Group 14 metal element or metalloid element in the long form of the periodic table of the elements is preferable, and in particular, silicon or tin is preferable. It is because silicon and tin have a high capability to insert and extract lithium, and can obtain a high energy density.

As an alloy of silicon, for example, an alloy including at least one kind selected from the group consisting of tin, nickel, copper, iron, cobalt, manganese, zinc, indium, silver, titanium (Ti), germanium, bismuth, antimony and chromium as a second element in addition to silicon is cited. As an alloy of tin, for example, an alloy including at least one kind selected from the group consisting of silicon, nickel, copper, iron, cobalt, manganese, zinc, indium, silver, titanium, germanium, bismuth, antimony and chromium as a second element in addition to tin is cited.

As a compound of silicon and a compound of tin, for example, a compound including oxygen (O) or carbon (C) is cited, and the compound may include the above-described second element in addition to silicon or tin.

The separator 15 may be made of any material having electrical stability and chemical stability against the cathode active material, the anode active material or a solvent, and having no electrical conductivity. For example, polymer nonwoven, a porous film, glass or ceramic fibers in a paper shape can be used, and a laminate including a plurality of any of them may be used. In particular, a porous polyolefin film is preferably used, and a composite including a heat-resistant material made of polyimide, glass or ceramic fibers in addition to the porous polyolefin film may be used.

The electrolyte 16 includes an electrolytic solution and a holding body including a polymer compound which holds the electrolytic solution, and has a so-called gel form. The electrolytic solution includes an electrolyte salt and a solvent in which the electrolyte salt is dissolved. Examples of the electrolyte salt include lithium salts such as $LiClO_4$, $LiPF_6$, $LiBF_4$, $LiN(SO_2CF_3)_2$, $LiN(SO_2C_2F_5)_2$, and $LiAsF_6$. As the electrolyte salt, one kind or a mixture of two or more kinds selected from them may be used.

Examples of the solvent include a cyclic carboxylate such as γ-butyrolactone, γ-valerolactone, δ-valerolactone or ε-caprolactone, a carbonate such as ethylene carbonate, propylene carbonate, butylene carbonate, vinylene carbonate, dimethyl carbonate, ethyl methyl carbonate or diethyl carbonate, an ether such as 1,2-dimethoxyethane, 1-ethoxy-2-methoxyethane, 1,2-diethoxyethane, tetrahydrofuran or 2-methyltetrahydrofuran, a nitrile such as acetonitrile, sulfolane-based solvents, phosphates, and nonaqueous solvents such as pyrrolidones. As the solvent, one kind or a mixture of two or more kinds selected from them may be used.

Among them, the cyclic carboxylate is preferable, because the boiling point is relatively high, and viscosity is relatively low, so the swelling of a battery can be prevented, and the low-temperature characteristics can be improved. Moreover, when the cyclic carboxylate is used as the solvent, a film is formed on the cathode 13, thereby internal resistance may be increased, and the cycle characteristics may decline; however, in the embodiment, the above-described cathode active material is preferably used in the cathode 13, because a decline in the cycle characteristics can be prevented. One kind or a mixture of two or more kinds of the cyclic carboxylates may be used. Moreover, as the solvent, only the cyclic carboxylate may be used, or a mixture of the cyclic carbonate and another solvent may be used. In this case, the ratio of the cyclic carboxylate in the solvent is preferably 20 wt % or more. It is because when the content of the cyclic carboxylate is too small, sufficient effects cannot be obtained.

As the polymer compound, any polymer compound absorbing a solvent to gelate is used, and, for example, a fluorine-based polymer compound such as a copolymer of polyvinylidene fluoride or vinylidene fluoride and hexafluoropropylene, an ether-based polymer compound such as a cross-link including polyethylene oxide or ethylene oxide, acrylonitrile, a material including propylene oxide or methylmethacrylate as a repeating unit is cited. As the polymer compound, only one kind or a mixture of two or more kinds selected from them may be used.

In particular, in terms of stability of oxidation-reduction, the fluorine-based polymer compound is preferable, and among them, a copolymer including vinylidene fluoride and hexafluoropropylene as components is preferable. Moreover, the copolymer may include a monoester of an unsaturated diacid such as monomethylmaleate, ethylene halide such as trifluorochloroethylene, a cyclic carbonate of an unsaturated compound such as vinylene carbonate, or an epoxy group-containing acrylic vinyl monomer as a component. It is because higher characteristics can be obtained.

Moreover, as the electrolyte 16, the electrolytic solution which is not held by a polymer compound may be used as a liquid electrolyte. In this case, the electrolytic solution is impregnated with the separator 15.

The open circuit voltage (that is, battery voltage) of the secondary battery in a fully charged state may be 4.20 V, but is preferably designed to be higher than 4.20 V, and within a range from 4.20 V to 6.00 V both inclusive. It is because when the battery voltage is increased, the energy density can be increased, and according to the embodiment, the chemical stability of the cathode active material is improved, so even if the battery voltage is increased, superior cycle characteristics can be obtained. In this case, compared to the case where the battery voltage is 4.20 V, even if the same cathode active material is used, the amount of extraction of lithium per unit weight is increased, so the amounts of the cathode active material and the anode active material are adjusted according to this.

The secondary battery can be manufactured by the following steps, for example.

At first, for example, the cathode active material layer 13B is formed on the cathode current collector 13A to form the cathode 13. The cathode active material layer 13B is formed, for example, by mixing the powder of the cathode active material, the electrical conductor and the binder to form a cathode mixture, dispersing the cathode mixture in a solvent such as N-methyl-2-pyrrolidone to form paste-form cathode mixture slurry, applying the cathode mixture slurry to the cathode current collector 13A, drying the cathode mixture slurry, and compression molding the cathode mixture slurry. Moreover, for example, as in the case of the cathode 13, the anode active material layer 14B is formed on the anode current collector 14A to form the anode 14. Next, a cathode lead 11 is attached to the cathode current collector 13A, and an anode lead 12 is attached to the anode current collector 14A.

Next, the electrolytic solution and the polymer compound are mixed through the use of a mixing solvent to form a mixture solution, and the mixture solution is applied to the cathode active material layer 13B and the anode active material layer 14B, and the mixing solvent is volatilized to form the electrolyte 16. Next, the cathode 13, the separator 15, the anode 14 and the separator 15 are laminated in order to form a laminate, and the laminate is spirally wound, and the protective tape 17 is bonded to an outermost part of the laminate so as to form the battery element 10, and then the battery element 10 is sandwiched by the package member 21, and the edge parts of the package member 21 are adhered to each other by thermal fusion bonding. At this time, the adhesive film 22 is inserted between the cathode lead 11 and the anode lead 12, and the package member 21. Thereby, the secondary battery shown in FIGS. 1 and 2 is obtained.

Moreover, instead of spirally winding the cathode 13 and the anode 14 after the electrolyte 16 is formed on the cathode 13 and the anode 14, after the cathode 13 and the anode 14 are spirally wound with the separator 15 in between, and sandwiched by the package member 21, electrolytic compositions which include the electrolytic solution and monomers of a polymer compound may be injected into the package member 21, and then the monomers may be polymerized in the package member 21.

Further, in the case where the electrolytic solution is used as the electrolyte 16, as described above, after the cathode 13 and the anode 14 are spirally wound, and sandwiched by the package member 21, the electrolytic solution is injected into the package member 21, and the package member 21 is sealed.

When the secondary battery is charged, for example, lithium ions are extracted from the cathode 13, and are inserted into the anode 14 through the electrolyte 16. On the other hand, when the secondary battery is discharged, for example, lithium ions are extracted from the anode 14, and are inserted into the cathode 13 through the electrolyte 16. At this time, the cathode 13 includes the cathode active material according to the embodiment, so the stability of the crystal structure is improved, and extraction and insertion of lithium take place smoothly. Therefore, even if the open circuit voltage in a fully charged state is high, the deteriorative reaction of the cathode 21 and the electrolytic solution is prevented.

Thus, according to the embodiment, a lithium cobalt complex oxide including predetermined amounts of the first element and the second element is included, and a predetermined amount of zirconium is included as a sub-component element, so the stability of the crystal structure can be improved, and the cycle characteristics at high temperature can be improved. Moreover, even if the open circuit voltage in a fully charged state is increased, superior cycle characteristics can be obtained.

In particular, when the particle size of the cathode active material at a frequency of 50% in a particle size distribution curve is within a range from 5 μm to 30 μm both inclusive, and the specific surface area is within a range from 0.1 $m^2$/g to 1.5 $m^2$/g both inclusive, higher effects can be obtained.

Moreover, when the cathode 13 includes the cathode active material according to the embodiment, and the electrolyte includes a cyclic carboxylate, while a decline in the cycle characteristics is prevented, the swelling can be prevented, and the low-temperature characteristics can be improved.

EXAMPLES

Specific examples of the invention will be described in detail below referring to drawings.

Examples 1-1 to 1-3, 2-1 to 2-3, 3-1 to 3-3

At first, cobalt sulfate and zirconium sulfate were dissolved in pure water, and a sodium hydrogen carbonate solution was added to coprecipitate zirconium as well as cobalt carbonate. At that time, the mixture ratio between cobalt sulfate and zirconium sulfate was changed in Examples 1-1 to 1-3, and the ratio of zirconium to cobalt was changed within a range from 0.01 mol % to 10 mol %. Moreover, in Examples 2-1 to 2-3 and 3-1 to 3-3, the ratio of zirconium to cobalt was 2 mol %.

Next, cobalt carbonate on which zirconium was coprecipitated, lithium carbonate, aluminum hydroxide and manganese carbonate were mixed and fired to obtain a cathode active material. At that time, in Examples 1-1 to 1-3, they were mixed so that the molar ratio of lithium:cobalt:aluminum:magnesium, that is, a:x:y:z in Chemical Formula 1 became 1:0.989:0.01:0.001, and in Examples 2-1 to 2-3, the molar ratio y of aluminum was changed within a range from 0.001 to 0.05, and in Examples 3-1 to 3-3, the molar ratio z of magnesium was changed within a range from 0.001 to 0.05. Moreover, in Examples 2-1 to 2-3 and 3-1 to 3-3, according to the molar ratio of y or z of aluminum or magnesium, the molar ratio x of cobalt was changed so that x+y+z=1 was established. When quantitative analysis was performed on the obtained cathode active material of each example by atomic absorption spectrometry, it was confirmed that a material with an almost desired composition was obtained.

Next, 92 wt % of the obtained particulate cathode active material, 3 wt % of powdery polyvinylidene fluoride as a binder, and 5 wt % of powdery graphite as an electrical conductor were kneaded through the use of N-methyl-2-pyrrolidone as a solvent to form cathode mixture slurry. Next, after the cathode mixture slurry was uniformly applied to both sides of the cathode current collector 13A made of aluminum foil, and was dried, the cathode mixture slurry was dried under reduced pressure. Then, the cathode mixture slurry was compression molded by a roller press to form the cathode active material layer 13B, thereby the cathode 13 was formed. After that, the cathode lead 11 made of an aluminum ribbon was welded to an end of the cathode 13.

Moreover, 90 wt % of mesophase spherical graphite as an anode active material and 10 wt % of powdery polyvinylidene fluoride as a binder were kneaded through the use of N-methyl-2-pyrrolidone as a solvent to form anode mixture slurry. Next, after the anode mixture slurry was uniformly applied to both sides of the anode current collector 14A made of copper foil, and was dried, the anode mixture slurry was dried under reduced pressure. Then, the anode mixture slurry was compression molded by a roller press to form the anode active material layer 14B, thereby the anode 14 was formed. At that time, the amounts of the cathode active material and the anode active material were adjusted, and it was designed so that the open circuit voltage in a fully charged state was 4.2 V, and the capacity of the anode 14 was represented by a capacity component by insertion and extraction of lithium. After that, the anode lead 12 made of a nickel ribbon was welded to an end of the anode 14.

Next, after the formed cathode 13 and the formed anode 14 were laminated with the separator 15 made of a porous polyethylene film, and were flatly wound, they were sandwiched by the package member 21 made of an aluminum laminate film, and edge parts except for edge parts on one side of the package member 21 were bonded together. Next, the electrolytic solution was injected into the package member 21, and the remaining edge parts on one side were bonded together, thereby the secondary battery shown in FIGS. 1 and 2 was formed. As the electrolytic solution, an electrolytic solution formed by dissolving 1 mol/l of $LiPF_6$ as an electrolyte salt in a solvent formed by mixing ethylene carbonate and ethyl methyl carbonate at a weight ratio of 1:1 was used.

Moreover, as Comparative Examples 1-1 to 1-4 relative to Examples 1-1 to 1-3, secondary batteries were formed as in the case of Examples 1-1 to 1-3, except that when the cathode active material was formed, the ratio of zirconium to cobalt was changed to 0 mol %, 0.005 mol %, 11 mol % or 12 mol %. Further, as Comparative Examples 2-1 to 2-4 relative to Examples 2-1 to 2-3, secondary batteries were formed as in the case of Examples 2-1 to 2-3, except that when the cathode active material was formed, the molar ratio y of aluminum was changed to 0 mol %, 0.0005 mol %, 0.06 mol % or 0.07 mol %. In addition, As Comparative Examples 3-1 to 3-4 relative to Examples 3-1 to 3-3, secondary batteries were formed as in the case of Examples 3-1 to 3-3, except that when the cathode active material was formed, the molar ratio z of magnesium was changed to 0 mol %, 0.0005 mol %, 0.06 mol % or 0.07 mol %.

Figure 3:
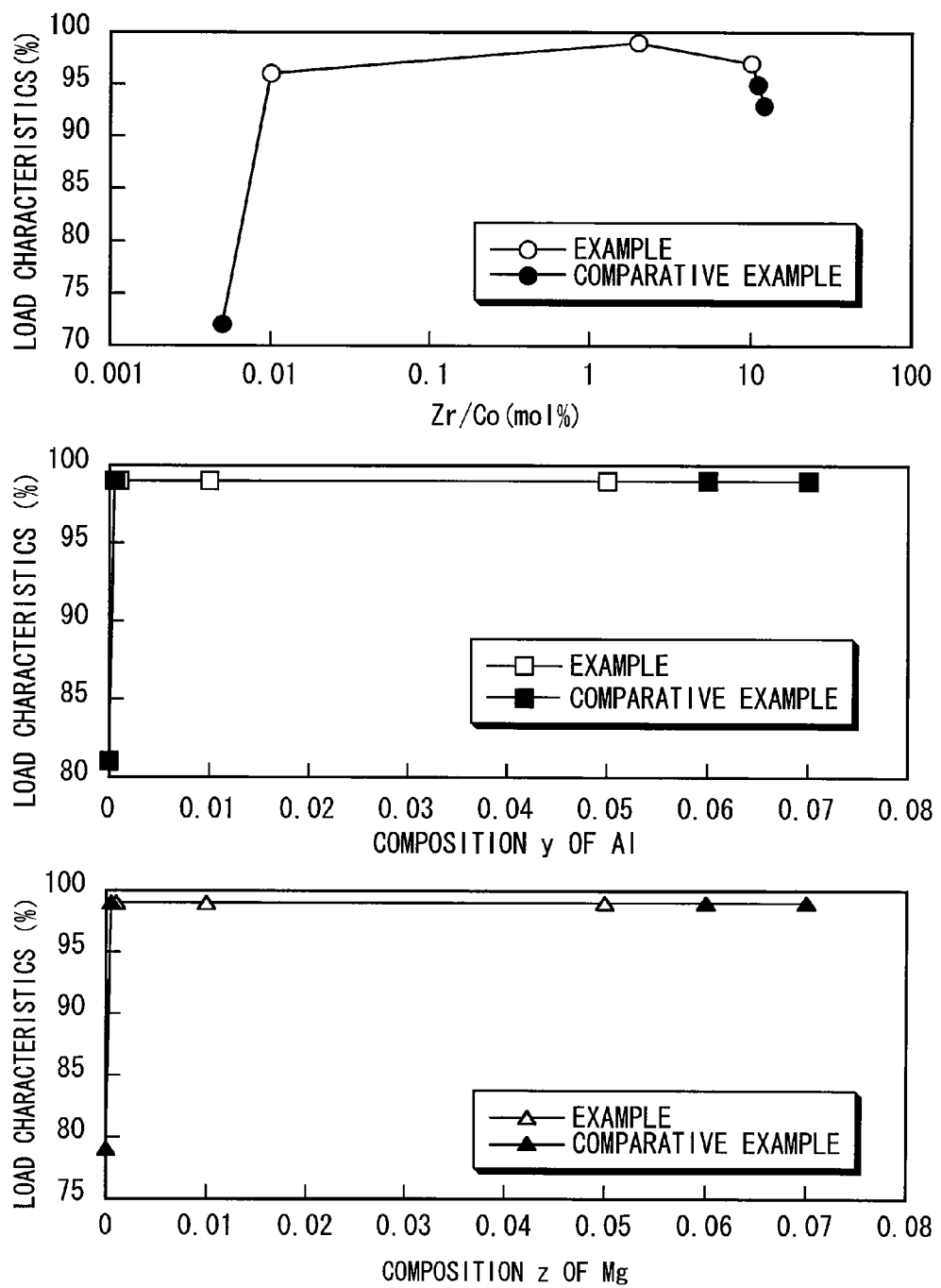
FIG. 3 is a plot showing a relationship between the content of zirconium, the composition y of a first element or the composition z of a second element, and load characteristics.
Figure 4:
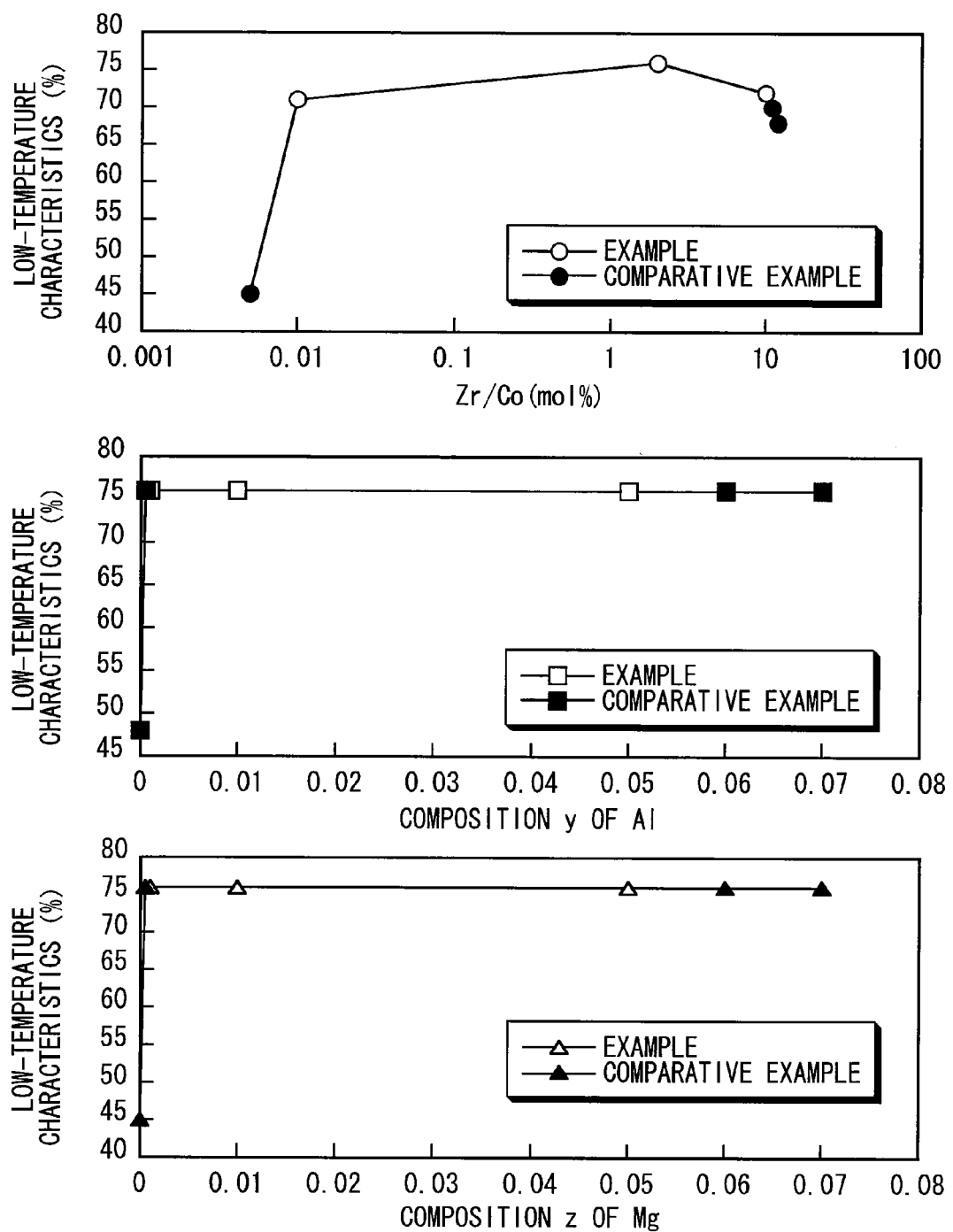
FIG. 4 is a plot showing a relationship between the content of zirconium, the composition y of the first element or the composition z of the second element, and low-temperature characteristics.
Figure 5:
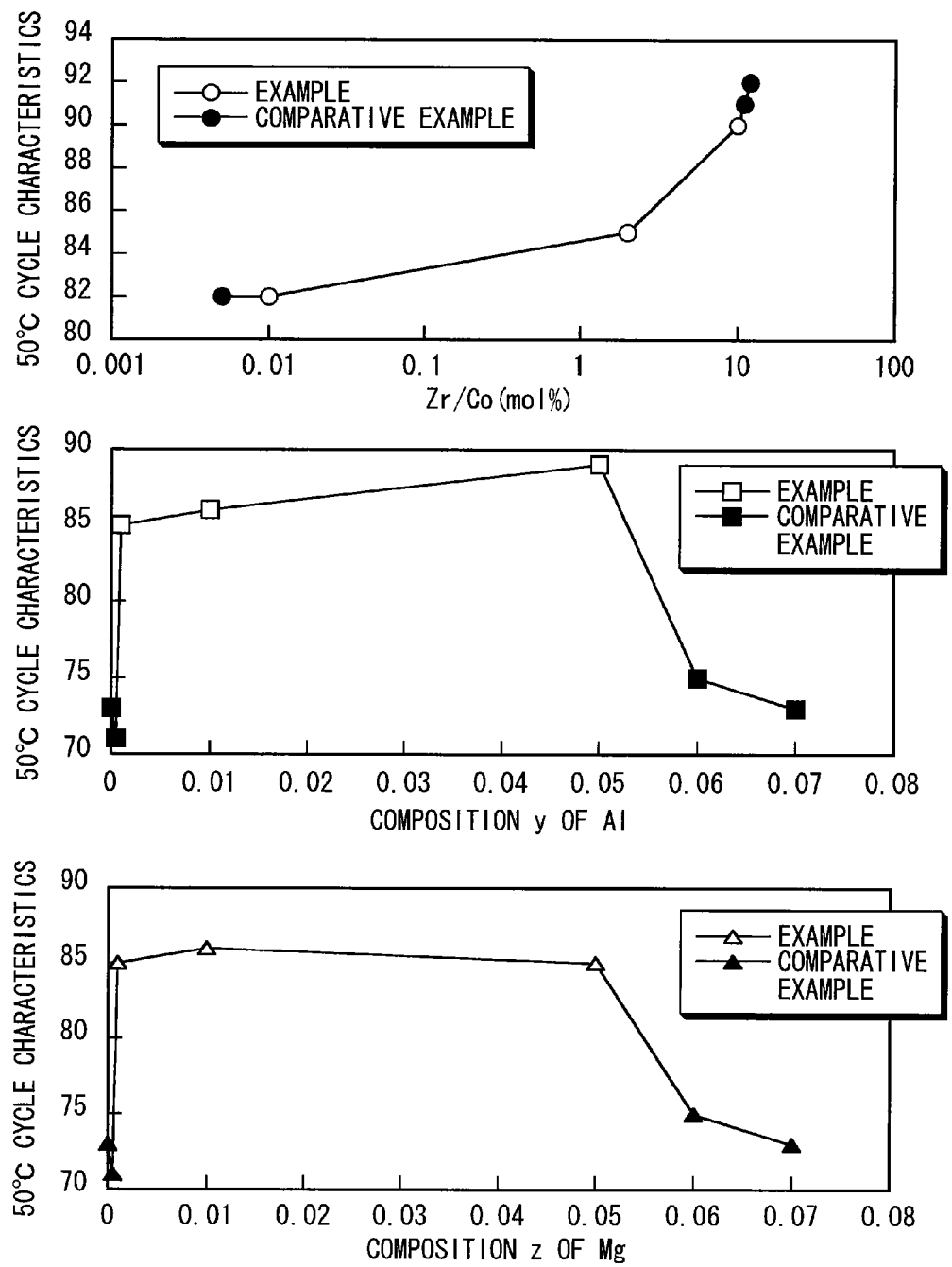
FIG. 5 is a plot showing a relationship between the content of zirconium, the composition y of the first element or the composition z of second element, and cycle characteristics at 50° C.

The formed secondary battery of each of the examples and the comparative examples was charged and discharged to determine the initial charge/discharge efficiency, the initial discharge capacity, the load characteristics, the low-temperature characteristics, and the cycle characteristics at 50° C. The results are shown in Table 1 and FIGS. 3 to 5. The initial discharge capacity is shown as a relative value in the case where the initial discharge capacity in Comparative Example 1-1 was 100.

The secondary battery was charged at a constant current and a constant voltage at 23° C. under conditions that the upper limit voltage was 4.2 V and the current was 1 C until the total charge time reached 3 hours, and then discharged at a constant current at 23° C. under conditions that the current was 0.2 C and the end voltage was 3 V, then the initial charge/discharge efficiency was determined by Formula 1 using the charge capacity and the discharge capacity at that time. In addition, 1 C represents a current value at which the theoretical capacity of a battery can be discharged for 1 hour, and 0.2 C represents a current value at which the theoretical capacity of the battery can be discharged for 5 hours.

$$\text{Initial charge/discharge efficiency (\%)} = (\text{initial discharge capacity/initial charge capacity}) \times 100 \quad \text{(Formula 1)}$$

The load characteristics were determined by Formula 2 using the discharge capacity in the case where the secondary battery was discharged at a constant current of 0.2 C and a final voltage of 3 V at 23° C., and the discharge capacity in the case where the secondary battery was discharged at a constant current of 3 C and a final voltage of 3 V at 23° C. At that time, the secondary battery was charged at a constant current and a constant voltage at 23° C. under conditions that the upper limit voltage was 4.2 V and the current was 1 C until the total charge time reached 3 hours. In addition, 3 C represents a current value at which the theoretical capacity of the battery can be discharged for 20 minutes.

$$\text{Load characteristics (\%)} = (\text{discharge capacity at a current of 3 C/discharge capacity at a current of 0.2 C}) \times 100 \quad \text{(Formula 2)}$$

3 hours. In addition, 0.5 C represents a current value at which the theoretical capacity of the battery can be discharged for 2 hours.

$$\text{Low-temperature characteristics (\%)} = (\text{discharge capacity at } -20° \text{ C./charge capacity at } 23° \text{ C.}) \times 100 \quad \text{(Formula 3)}$$

After the secondary battery was charged at a constant current and a constant voltage at 50° C. under conditions that the upper limit voltage was 4.2 V and the current was 1 C until the total charge time reached 3 hours, the secondary battery was discharged at a constant current at 50° C. under conditions that the current was 1 C and the end voltage was 3 V, then the cycle characteristics at 50° C. were determined by Formula 4 using a discharge capacity in the first cycle and a discharge capacity in the 300th cycle.

$$\text{Cycle characteristics at 50° C. (\%)} = (\text{discharge capacity at 50° C. in 300th cycle/discharge capacity at 50° C. in the first cycle}) \times 100 \quad \text{(Formula 4)}$$

TABLE 1

| | Al COMPOSITION y | Mg COMPOSITION z | Zr/Co (mol %) | INITIAL CHARGE/DISCHARGE EFFICIENCY (%) | INITIAL DISCHARGE CAPACITY (RELATIVE VALUE) | LOAD CHARACTERISTICS (%) | LOW-TEMPERATURE CHARACTERISTICS (%) | 50° C. CHARACTERISTICS (%) |
|---|---|---|---|---|---|---|---|---|
| EXAMPLE 1-1 | 0.01 | 0.001 | 0.01 | 93 | 99 | 96 | 71 | 82 |
| EXAMPLE 1-2 | | | 2 | 93 | 97 | 99 | 76 | 85 |
| EXAMPLE 1-3 | | | 10 | 93 | 94 | 97 | 72 | 90 |
| EXAMPLE 2-1 | 0.001 | 0.01 | 2 | 94 | 97 | 99 | 76 | 85 |
| EXAMPLE 2-2 | 0.01 | | | 93 | 97 | 99 | 76 | 86 |
| EXAMPLE 2-3 | 0.05 | | | 91 | 97 | 99 | 76 | 89 |
| EXAMPLE 3-1 | 0.01 | 0.001 | 2 | 93 | 97 | 99 | 76 | 85 |
| EXAMPLE 3-2 | | 0.01 | | 93 | 97 | 99 | 76 | 86 |
| EXAMPLE 3-3 | | 0.05 | | 93 | 97 | 99 | 76 | 85 |
| COMPARATIVE EXAMPLE 1-1 | 0.01 | 0.001 | 0 | 93 | 100 | 70 | 43 | 80 |
| COMPARATIVE EXAMPLE 1-2 | | | 0.005 | 93 | 99 | 72 | 45 | 82 |
| COMPARATIVE EXAMPLE 1-3 | | | 11 | 93 | 73 | 95 | 70 | 91 |
| COMPARATIVE EXAMPLE 1-4 | | | 12 | 93 | 71 | 93 | 68 | 92 |
| COMPARATIVE EXAMPLE 2-1 | 0 | 0.01 | 2 | 95 | 97 | 81 | 48 | 73 |
| COMPARATIVE EXAMPLE 2-2 | 0.0005 | | | 95 | 97 | 99 | 76 | 71 |
| COMPARATIVE EXAMPLE 2-3 | 0.06 | | | 80 | 97 | 99 | 76 | 75 |
| COMPARATIVE EXAMPLE 2-4 | 0.07 | | | 75 | 97 | 99 | 76 | 73 |
| COMPARATIVE EXAMPLE 3-1 | 0.01 | 0 | 2 | 93 | 97 | 79 | 45 | 73 |
| COMPARATIVE EXAMPLE 3-2 | | 0.0005 | | 93 | 97 | 99 | 76 | 71 |
| COMPARATIVE EXAMPLE 3-3 | | 0.06 | | 93 | 97 | 99 | 76 | 75 |
| COMPARATIVE EXAMPLE 3-4 | | 0.07 | | 93 | 97 | 99 | 76 | 73 |

The low-temperature characteristics were determined by Formula 3 using a discharge capacity in the case where the secondary battery was discharged at a constant current at 23° C. under conditions that the current was 0.5 C and the end voltage was 3 V and a discharge capacity in the case where the secondary battery was discharged at a constant current at −20° C. under conditions that the current was 0.5 C and the end voltage was 3 V. At that time, the secondary battery was charged at a constant current and a constant voltage at 23° C. under conditions that the upper limit voltage was 4.2 V and the current was 1 C until the total charge time reached Solvent; ethylene carbonate+ethyl methyl carbonate As shown in Table 1 and FIGS. 3 to 5, there was a tendency that when the content of zirconium increased, the load characteristics and the low-temperature characteristics were improved to a maximum value, then declined, and there was a tendency that when aluminum as the first element and magnesium as the second element were included, the load characteristics and the low-temperature characteristics were improved. Moreover, there was a tendency that when the content of zirconium increased, the cycle characteristics at 50° C. were improved, and when the contents of aluminum and magnesium increased, the cycle characteristics at 50° C. increased to a maximum value, then declined.

discharge capacity is shown as a relative value in the case where the initial discharge capacity in Comparative Example 1-1 was 100.

TABLE 2

|  | Al COMPO-SITION y | Mg COMPO-SITION z | Zr/Co (mol %) | INITIAL CHARGE/DISCHARGE EFFICIENCY (%) | INITIAL DISCHARGE CAPACITY (RELATIVE VALUE) | LOAD CHARAC-TERISTICS (%) | LOW-TEMPERATURE CHARACTERISTICS (%) | 50° C. CHARAC-TERISTICS (%) |
|---|---|---|---|---|---|---|---|---|
| EXAMPLE 4-1 | 0.01 | 0.001 | 0.01 | 90 | 96 | 96 | 51 | 82 |
| EXAMPLE 4-2 |  |  | 2 | 90 | 94 | 99 | 56 | 85 |
| EXAMPLE 4-3 |  |  | 10 | 90 | 91 | 97 | 52 | 90 |
| EXAMPLE 5-1 | 0.001 | 0.01 | 2 | 91 | 94 | 99 | 56 | 85 |
| EXAMPLE 5-2 | 0.01 |  |  | 90 | 94 | 99 | 56 | 86 |
| EXAMPLE 5-3 | 0.05 |  |  | 88 | 94 | 99 | 56 | 89 |
| EXAMPLE 6-1 | 0.01 | 0.001 | 2 | 90 | 94 | 99 | 56 | 85 |
| EXAMPLE 6-2 |  | 0.01 |  | 90 | 94 | 99 | 56 | 86 |
| EXAMPLE 6-3 |  | 0.05 |  | 90 | 94 | 99 | 56 | 85 |
| COMPARATIVE EXAMPLE 4-1 | 0.01 | 0.001 | 0 | 90 | 97 | 70 | 23 | 80 |
| COMPARATIVE EXAMPLE 4-2 |  |  | 0.005 | 90 | 96 | 72 | 25 | 82 |
| COMPARATIVE EXAMPLE 4-3 |  |  | 11 | 90 | 70 | 95 | 50 | 91 |
| COMPARATIVE EXAMPLE 4-4 |  |  | 12 | 90 | 68 | 93 | 48 | 92 |
| COMPARATIVE EXAMPLE 5-1 | 0 | 0.01 | 2 | 92 | 94 | 80 | 45 | 73 |
| COMPARATIVE EXAMPLE 5-2 | 0.0005 |  |  | 92 | 94 | 99 | 56 | 71 |
| COMPARATIVE EXAMPLE 5-3 | 0.06 |  |  | 77 | 94 | 99 | 56 | 75 |
| COMPARATIVE EXAMPLE 5-4 | 0.07 |  |  | 72 | 94 | 99 | 56 | 73 |
| COMPARATIVE EXAMPLE 6-1 | 0.01 | 0 | 2 | 90 | 94 | 81 | 46 | 73 |
| COMPARATIVE EXAMPLE 6-2 |  | 0.0005 |  | 90 | 94 | 99 | 56 | 71 |
| COMPARATIVE EXAMPLE 6-3 |  | 0.06 |  | 90 | 94 | 99 | 56 | 75 |
| COMPARATIVE EXAMPLE 6-4 |  | 0.07 |  | 90 | 94 | 99 | 56 | 73 |

In other words, it was found out that when the ratio of zirconium to cobalt was within a range from 0.01 mol % to 10 mol % both inclusive, and the composition y of the first element was within a range from 0.001 to 0.05 both inclusive, and the composition z of the second element was within a range from 0.001 to 0.05 both inclusive, the load characteristics, the low-temperature characteristics and the cycle characteristics at high temperature could be improved.

Examples 4-1 to 4-3, 5-1 to 5-3, 6-1 to 6-3

Secondary batteries were formed as in the case of Examples 1-1 to 1-3, 2-1 to 2-3 and 3-1 to 3-3, except that in the electrolytic solution, a solvent formed by mixing ethylene carbonate and propylene carbonate at a weight ratio of 1:1 was used. Moreover, as Comparative Examples 4-1 to 4-4, 5-1 to 5-4, and 6-1 to 6-4 relative to the examples, secondary batteries were formed as in the case of the examples, except that the ratio of zirconium to cobalt, the molar ratio y of aluminum or the molar ratio z of magnesium was changed.

Figure 6:
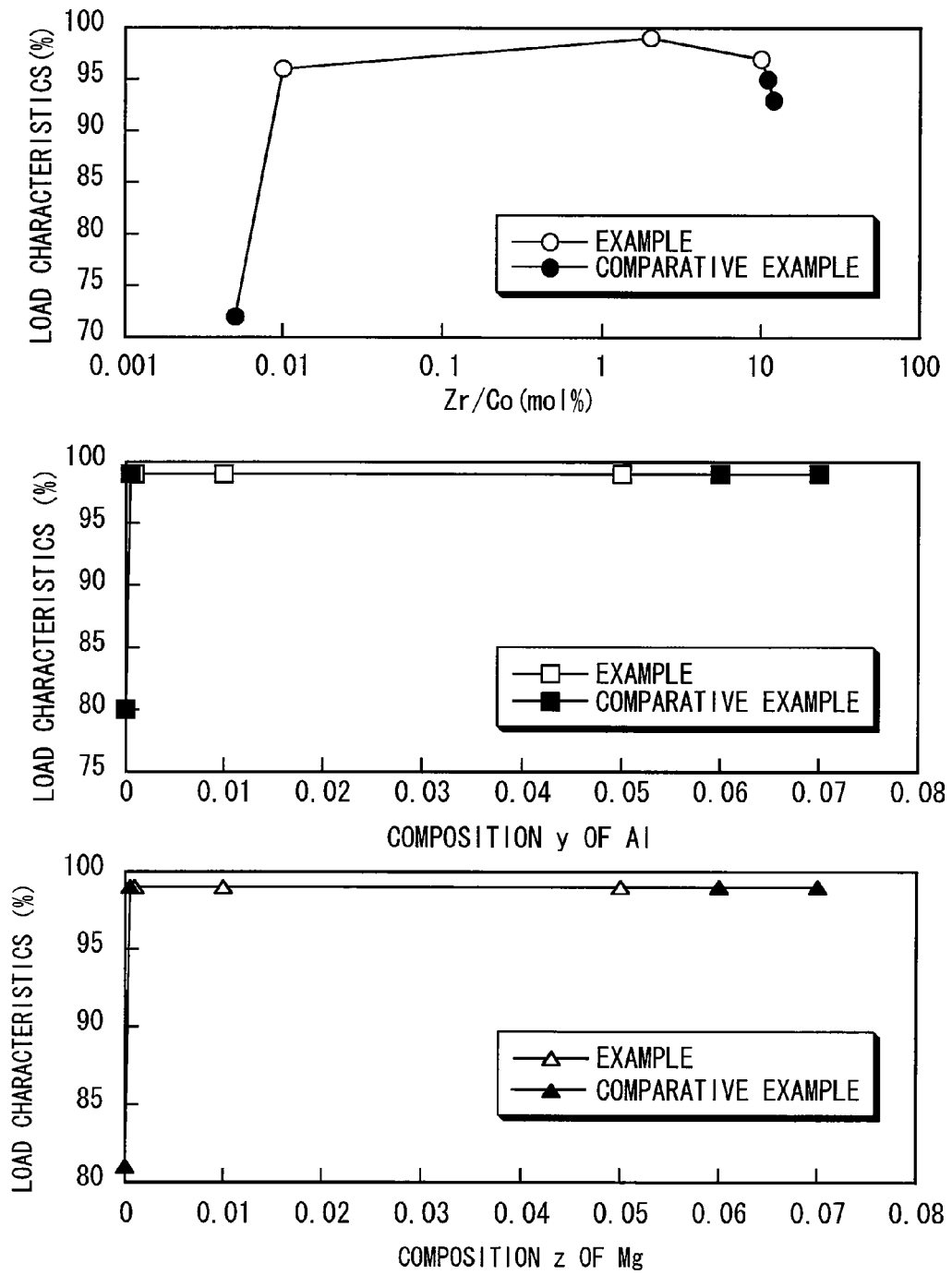
FIG. 6 is a plot showing a relationship between the content of zirconium, the composition y of the first element or the composition z of the second element, and load characteristics.
Figure 7:
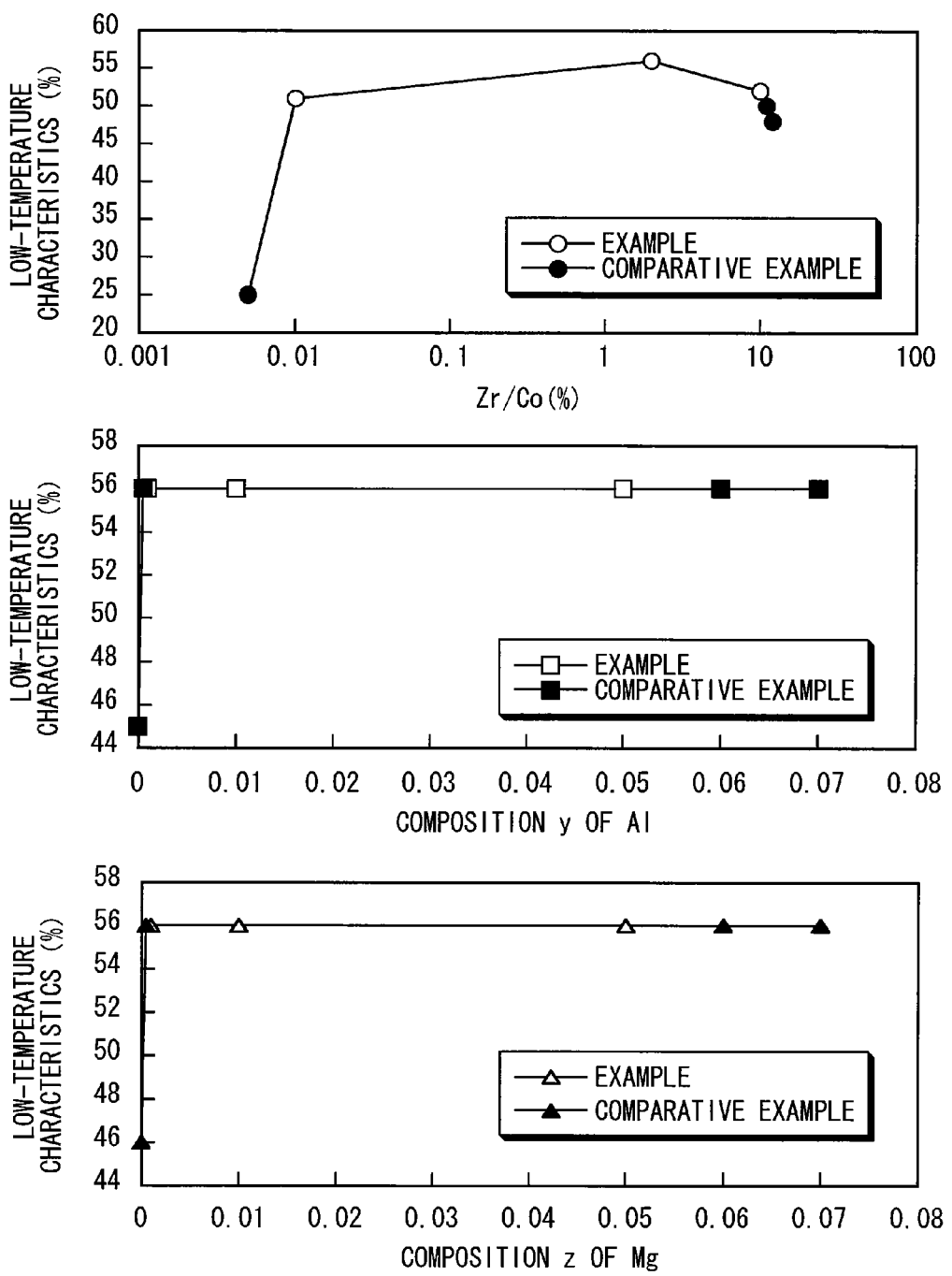
FIG. 7 is a plot showing a relationship between the content of zirconium, the composition y of the first element or the composition z of the second element, and low-temperature characteristics.
Figure 8:
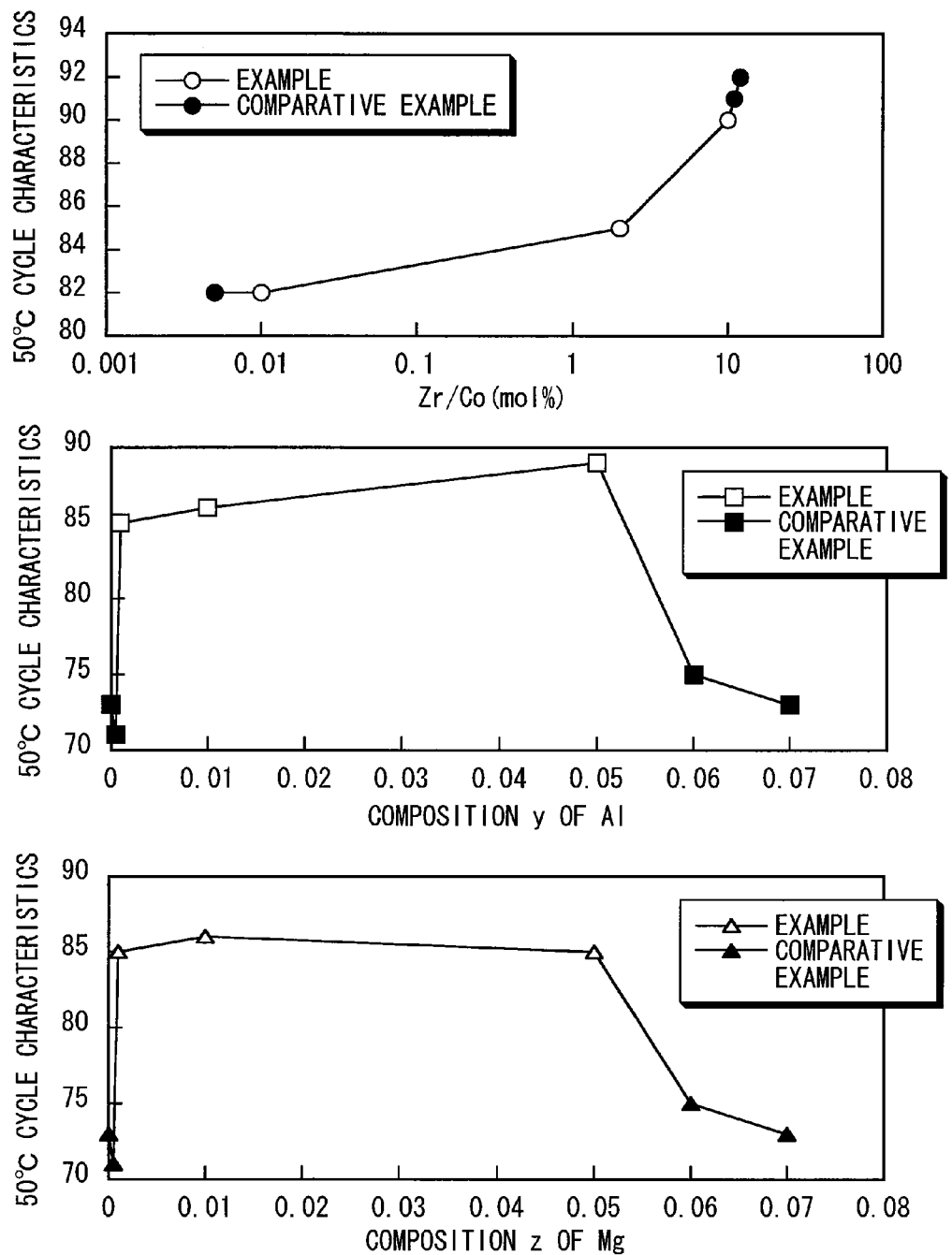
FIG. 8 is a plot showing a relationship between the content of zirconium, the composition y of the first element or the composition z of the second element, and cycle characteristics at 50° C.

The initial charge/discharge efficiency, the initial discharge capacity, the load characteristics, the low-temperature characteristics and the cycle characteristics at 50° C. of the formed secondary batteries of the examples and the comparative examples were determined as in the case of Examples 1-1 to 1-3, 2-1 to 2-3 and 3-1 to 3-3. The results are shown in Table 2 and FIGS. 6 to 8. In addition, the initial Solvent; ethylene carbonate+propylene carbonate As shown in Table 2 and FIGS. 6 to 8, in the examples, as in the case of Examples 1-1 to 1-3, 2-1 to 2-3 and 3-1 to 3-3, when the content of zirconium, the composition y of aluminum and the composition z of magnesium were within the above-described ranges, the load characteristics, the low-temperature characteristics the cycle characteristics at high temperature could be improved. In other words, it was found out that even if another solvent was used, the same effects could be obtained.

Examples 7-1 to 7-4, 8-1 to 8-4

Secondary batteries were formed as in the case of Examples 1-1 to 1-3 and 4-1 to 4-3, except that the gel electrolyte 16 formed by holding the electrolytic solution by a polymer compound was used. At that time, the ratio of zirconium to cobalt in the cathode active material was 1 mol %, the molar ratio of lithium:cobalt:aluminum:magnesium, that is, a:x:y:z in Chemical Formula 1 was 1:0.989:0.01:0.001. Moreover, in the electrolytic solution, in Examples 7-1 to 7-4, a solvent formed by mixing ethylene carbonate and ethyl methyl carbonate at a weight ratio of 1:1 was used, and in Example 8-1 to 8-4, a solvent formed by mixing ethylene carbonate and propylene carbonate at a weight ratio of 1:1 was used. Further, as the polymer compound in the electrolyte 16, in Examples 7-1 and 8-1, polyvinylidene fluoride was used, in Examples 7-2 and 8-2, polyethylene oxide was used, in Examples 7-3 and 8-3, polymethylmethacrylate was used, and in Example 7-4 and 8-4, polyacrylonitrile was used.

As Comparative Examples 7-1 to 7-4 and 8-1 to 8-4 relative to the examples, secondary batteries were formed as in the case of Examples 7-1 to 7-4 and 8-1 to 8-4, except that when the cathode active material was formed, zirconium was not coprecipitated, and cobalt carbonate was used as it is.

The initial charge/discharge efficiency, the initial discharge capacity, the load characteristics, the low-temperature characteristics and the cycle characteristics at 50° C. of the formed secondary batteries of the examples and the comparative examples were determined as in the case of Examples 1-1 to 1-3, and 4-1 to 4-3. The results are shown in Tables 3 and 4. In addition, the initial discharge capacity is shown as a relative value in the case where the initial discharge capacity in Comparative Example 1-1 was 100.

Examples 9-1 to 9-12, 10-1 to 10-12, 11-1 to 11-6, 12-1 to 12-6, 13-1 to 13-18

Secondary batteries were formed as in the case of Example 1-1, except that another cathode active material was mixed and used with the cathode active material according to the invention used in Example 1-1. At that time, as another cathode active material, in Examples 9-1 to 9-6, $LiNi_{0.40}Co_{0.30}Mn_{0.30}O_2$ and $LiMn_2O_4$ were used, in Examples 9-7 to 9-12, $LiNi_{0.20}Co_{0.40}Mn_{0.40}O_2$ was used, in Examples 10-1 to 10-6, $LiNi_{0.59}Co_{0.40}Al_{0.01}O_2$ and $LiMn_2O_4$ were used, in Examples 10-7 to 10-12, $LiNi_{0.50}Co_{0.50}O_2$ was used, in Examples 11-1 to 11-6, $LiNi_{0.40}Co_{0.30}Mn_{0.30}O_2$ and $LiFePO_4$ were used, in Examples 12-1 to 12-6, $LiNi_{0.59}Co_{0.40}Al_{0.01}O_2$ and $LiFePO_4$ were used, and in Examples 13-1 to 13-18, $LiMn_2O_4$ and $LiFePO_4$ were used, or one of them was used. Moreover, the mixture ratio of the cathode active materials was changed as shown in Tables 5 to 9 in each example.

As Comparative Examples 9-1, 9-2, 10-1, 10-2, 11-1, 12-1, and 13-1 to 13-3 relative to the examples, secondary

TABLE 3

| POLYMER COMPOUND | Zr/Co (mol %) | INITIAL CHARGE/ DISCHARGE EFFICIENCY (%) | INITIAL DISCHARGE CAPACITY (RELATIVE VALUE) | LOAD CHARAC- TERISTICS (%) | LOW- TEMPERATURE CHARACTERISTICS (%) | 50° C. CHARAC- TERISTICS (%) |
|---|---|---|---|---|---|---|
| polyvinylidene fluoride | 1 | 93 | 98 | 98 | 73 | 83 |
| polyethylene oxide | 1 | 93 | 98 | 98 | 73 | 83 |
| polymethylmethacrylate | 1 | 93 | 98 | 98 | 73 | 83 |
| polyacrylonitrile | 1 | 93 | 98 | 98 | 73 | 83 |
| polyvinylidene fluoride | 0 | 93 | 100 | 70 | 43 | 80 |
| polyethylene oxide | 0 | 93 | 100 | 70 | 43 | 80 |
| polymethylmethacrylate | 0 | 93 | 100 | 70 | 43 | 80 |
| polyacrylonitrile | 0 | 93 | 100 | 70 | 43 | 80 |

Solvent; ethylene carbonate+ethyl methyl carbonate

TABLE 4

| POLYMER COMPOUND | Zr/Co (mol %) | INITIAL CHARGE/ DISCHARGE EFFICIENCY (%) | INITIAL DISCHARGE CAPACITY (RELATIVE VALUE) | LOAD CHARAC- TERISTICS (%) | LOW- TEMPERATURE CHARACTERISTICS (%) | 50° C. CHARACTERISTICS (%) |
|---|---|---|---|---|---|---|
| polyvinylidene fluoride | 1 | 93 | 98 | 98 | 53 | 83 |
| polyethylene oxide | 1 | 93 | 98 | 98 | 53 | 83 |
| polymethylmethacrylate | 1 | 93 | 98 | 98 | 53 | 83 |
| polyacrylonitrile | 1 | 93 | 98 | 98 | 53 | 83 |
| polyvinylidene fluoride | 0 | 90 | 97 | 70 | 23 | 80 |
| polyethylene oxide | 0 | 90 | 97 | 70 | 23 | 80 |
| polymethylmethacrylate | 0 | 90 | 97 | 70 | 23 | 80 |
| polyacrylonitrile | 0 | 90 | 97 | 70 | 23 | 80 |

Solvent; ethylene carbonate+propylene carbonate

As shown in Tables 3 and 4, in the examples, when the content of zirconium, the composition y of aluminum and the composition z of magnesium were within the above-described ranges, load characteristics, the low-temperature characteristics and the cycle characteristics at high temperature could be improved. In other words, it was found out that even if the gel electrolyte 16 was used, the same effects could be obtained.

batteries were formed as in the case of the examples, except that the cathode active material according to the invention was not used.

The initial charge/discharge efficiency, the initial discharge capacity, the load characteristics, the low-temperature characteristics and the cycle characteristics at 50° C. of the formed secondary batteries of the examples and the comparative examples were determined as in the case of Example 1-1. The results are shown in Tables 5 to 9 together with the results of Example 1-1. In addition, the initial discharge capacity is shown as a relative value in the case where the initial discharge capacity in Comparative Example 1-1 was 100.

TABLE 5

| CATHODE ACTIVE MATERIAL (WT %) | | | | INITIAL CHARGE/ DISCHARGE EFFICIENCY | INITIAL DISCHARGE CAPACITY (RELATIVE | LOAD CHARAC- TERISTICS | LOW- TEMPERATURE CHARACTERISTICS | 50° C. CHARAC- TERISTICS |
|---|---|---|---|---|---|---|---|---|
| A | B | C | $LiMn_2O_4$ | (%) | VALUE) | (%) | (%) | (%) |
| 3 | 37 | 0 | 60 | 93 | 99 | 68 | 35 | 82 |
| 8 | 42 | 0 | 50 | 93 | 99 | 73 | 39 | 82 |
| 10 | 50 | 0 | 40 | 93 | 99 | 82 | 59 | 82 |
| 30 | 30 | 0 | 40 | 93 | 99 | 86 | 62 | 82 |
| 50 | 20 | 0 | 30 | 93 | 99 | 90 | 65 | 82 |
| 80 | 10 | 0 | 10 | 93 | 99 | 94 | 68 | 82 |
| 3 | 0 | 97 | 0 | 93 | 99 | 68 | 35 | 82 |
| 8 | 0 | 92 | 0 | 93 | 99 | 73 | 39 | 82 |
| 10 | 0 | 90 | 0 | 93 | 99 | 82 | 59 | 82 |
| 30 | 0 | 70 | 0 | 93 | 99 | 86 | 62 | 82 |
| 50 | 0 | 50 | 0 | 93 | 99 | 90 | 65 | 82 |
| 80 | 0 | 20 | 0 | 93 | 99 | 94 | 68 | 82 |
| 100 | 0 | 0 | 0 | 93 | 99 | 96 | 71 | 82 |
| 0 | 40 | 0 | 60 | 93 | 99 | 65 | 33 | 82 |
| 0 | 0 | 100 | 0 | 93 | 99 | 65 | 33 | 82 |

Cathode active material
A: $LiCo_{0.989}Al_{0.01}Mg_{0.001}O_2$ + Zr (0.01 mol %)
B: $LiNi_{0.40}Co_{0.30}Mn_{0.30}O_2$
C: $LiNi_{0.20}Co_{0.40}Mn_{0.40}O_2$

TABLE 6

| CATHODE ACTIVE MATERIAL (WT %) | | | | INITIAL CHARGE/ DISCHARGE EFFICIENCY | INITIAL DISCHARGE CAPACITY (RELATIVE | LOAD CHARAC- TERISTICS | LOW- TEMPERATURE CHARACTERISTICS | 50° C. CHARAC- TERISTICS |
|---|---|---|---|---|---|---|---|---|
| A | D | E | $LiMn_2O_4$ | (%) | VALUE) | (%) | (%) | (%) |
| 3 | 40 | 0 | 57 | 93 | 99 | 68 | 35 | 82 |
| 8 | 25 | 0 | 67 | 93 | 99 | 73 | 39 | 82 |
| 10 | 40 | 0 | 50 | 93 | 99 | 82 | 59 | 82 |
| 30 | 30 | 0 | 40 | 93 | 99 | 86 | 62 | 82 |
| 50 | 30 | 0 | 20 | 93 | 99 | 90 | 65 | 82 |
| 80 | 5 | 0 | 15 | 93 | 99 | 94 | 68 | 82 |
| 3 | 0 | 97 | 0 | 93 | 99 | 68 | 35 | 82 |
| 8 | 0 | 92 | 0 | 93 | 99 | 73 | 39 | 82 |
| 10 | 0 | 90 | 0 | 93 | 99 | 82 | 59 | 82 |
| 30 | 0 | 70 | 0 | 93 | 99 | 86 | 62 | 82 |
| 50 | 0 | 50 | 0 | 93 | 99 | 90 | 65 | 82 |
| 80 | 0 | 20 | 0 | 93 | 99 | 94 | 68 | 82 |
| 100 | 0 | 0 | 0 | 93 | 99 | 96 | 71 | 82 |
| 0 | 60 | 0 | 40 | 93 | 99 | 65 | 33 | 82 |
| 0 | 0 | 100 | 0 | 93 | 99 | 65 | 33 | 82 |

Cathode active material
A: $LiCo_{0.989}Al_{0.01}Mg_{0.001}O_2$ + Zr (0.01 mol %)
D: $LiNi_{0.59}Co_{0.40}Al_{0.01}O_2$
E: $LiNi_{0.50}Co_{0.50}O_2$

TABLE 7

| CATHODE ACTIVE MATERIAL (WT %) | | | INITIAL CHARGE/ DISCHARGE EFFICIENCY | INITIAL DISCHARGE CAPACITY (RELATIVE | LOAD CHARAC- TERISTICS | LOW- TEMPERATURE CHARACTERISTICS | 50° C. CHARACTERISTICS |
|---|---|---|---|---|---|---|---|
| A | B | $LiFePO_4$ | (%) | VALUE) | (%) | (%) | (%) |
| 3 | 37 | 60 | 93 | 99 | 68 | 35 | 82 |
| 8 | 42 | 50 | 93 | 99 | 73 | 39 | 82 |
| 10 | 50 | 40 | 93 | 99 | 82 | 59 | 82 |

TABLE 7-continued

| CATHODE ACTIVE MATERIAL (WT %) | | | INITIAL CHARGE/ DISCHARGE EFFICIENCY | INITIAL DISCHARGE CAPACITY (RELATIVE | LOAD CHARAC- TERISTICS | LOW- TEMPERATURE CHARACTERISTICS | 50° C. CHARACTERISTICS |
|---|---|---|---|---|---|---|---|
| A | B | LiFePO$_4$ | (%) | VALUE) | (%) | (%) | (%) |
| 30 | 30 | 40 | 93 | 99 | 86 | 62 | 82 |
| 50 | 20 | 30 | 93 | 99 | 90 | 65 | 82 |
| 80 | 10 | 10 | 93 | 99 | 94 | 68 | 82 |
| 100 | 0 | 0 | 93 | 99 | 96 | 71 | 82 |
| 0 | 40 | 60 | 93 | 99 | 65 | 33 | 82 |

Cathode active material
A: LiCo$_{0.989}$Al$_{0.01}$Mg$_{0.001}$O$_2$ + Zr (0.01 mol %)
B: LiNi$_{0.40}$Co$_{0.30}$Mn$_{0.30}$O$_2$

TABLE 8

| CATHODE ACTIVE MATERIAL (WT %) | | | INITIAL CHARGE/ DISCHARGE EFFICIENCY | INITIAL DISCHARGE CAPACITY (RELATIVE | LOAD CHARAC- TERISTICS | LOW- TEMPERATURE CHARACTERISTICS | 50° C. CHARACTERISTICS |
|---|---|---|---|---|---|---|---|
| A | D | LiFePO$_4$ | (%) | VALUE) | (%) | (%) | (%) |
| 3 | 40 | 57 | 93 | 99 | 68 | 35 | 82 |
| 8 | 25 | 67 | 93 | 99 | 73 | 39 | 82 |
| 10 | 40 | 50 | 93 | 99 | 82 | 59 | 82 |
| 30 | 30 | 40 | 93 | 99 | 86 | 62 | 82 |
| 50 | 30 | 20 | 93 | 99 | 90 | 65 | 82 |
| 80 | 5 | 15 | 93 | 99 | 94 | 68 | 82 |
| 100 | 0 | 0 | 93 | 99 | 96 | 71 | 82 |
| 0 | 60 | 40 | 93 | 99 | 65 | 33 | 82 |

Cathode active material
A: LiCo$_{0.989}$Al$_{0.01}$Mg$_{0.001}$O$_2$ + Zr (0.01 mol %)
D: LiNi$_{0.59}$Co$_{0.40}$Al$_{0.01}$O$_2$

TABLE 9

| CATHODE ACTIVE MATERIAL (WT %) | | | INITIAL CHARGE/ DISCHARGE EFFICIENCY | INITIAL DISCHARGE CAPACITY (RELATIVE | LOAD CHARACTER- ISTICS | LOW-TEMPERATURE CHARACTERISTICS | 50° C. CHARACTERISTICS |
|---|---|---|---|---|---|---|---|
| A | LiMn$_2$O$_4$ | LiFePO$_4$ | (%) | VALUE) | (%) | (%) | (%) |
| 3 | 37 | 60 | 93 | 99 | 68 | 35 | 82 |
| 8 | 42 | 50 | 93 | 99 | 73 | 39 | 82 |
| 10 | 50 | 40 | 93 | 99 | 82 | 59 | 82 |
| 30 | 30 | 40 | 93 | 99 | 86 | 62 | 82 |
| 50 | 20 | 30 | 93 | 99 | 90 | 65 | 82 |
| 80 | 10 | 10 | 93 | 99 | 94 | 68 | 82 |
| 3 | 97 | 0 | 93 | 99 | 68 | 35 | 82 |
| 8 | 92 | 0 | 93 | 99 | 73 | 39 | 82 |
| 10 | 90 | 0 | 93 | 99 | 82 | 59 | 82 |
| 30 | 70 | 0 | 93 | 99 | 86 | 62 | 82 |
| 50 | 50 | 0 | 93 | 99 | 90 | 65 | 82 |
| 80 | 20 | 0 | 93 | 99 | 94 | 68 | 82 |
| 3 | 0 | 97 | 93 | 99 | 68 | 35 | 82 |
| 8 | 0 | 92 | 93 | 99 | 73 | 39 | 82 |
| 10 | 0 | 90 | 93 | 99 | 82 | 59 | 82 |
| 30 | 0 | 70 | 93 | 99 | 86 | 62 | 82 |
| 50 | 0 | 50 | 93 | 99 | 90 | 65 | 82 |
| 80 | 0 | 20 | 93 | 99 | 94 | 68 | 82 |
| 100 | 0 | 0 | 93 | 99 | 96 | 71 | 82 |
| 0 | 40 | 60 | 93 | 99 | 65 | 33 | 82 |
| 0 | 100 | 0 | 93 | 99 | 65 | 33 | 82 |
| 0 | 0 | 100 | 93 | 99 | 65 | 33 | 82 |

Cathode active material
A: LiCo$_{0.989}$Al$_{0.01}$Mg$_{0.001}$O$_2$ + Zr (0.01 mol %)

As shown in Tables 5 to 9, in each of the examples in which the cathode active material according to the invention was used, the load characteristics and the low-temperature characteristics could be improved, compared to each of the comparative examples in which the anode active material according to the invention was not used. Moreover, there was a tendency that the more the ratio of the cathode active material according to the invention increased, the more they were improved. In other words, it was found out that even if another cathode active material was mixed and used with the cathode active material according to the invention, the effects could be obtained, and when the ratio of the cathode active material according to the invention in the whole cathode active material was 10 wt % or more, higher effects could be obtained.

Examples 14-1 to 14-11, 15-1 to 15-12)

Secondary batteries were formed as in the case of Example 1-1, except that the particle size and the specific surface area of the cathode active material according to the invention were changed. At that time, in Examples 14-1 to 14-11, the particle size of the cathode active material at a frequency of 50% in a particle size distribution curve was changed within a range from 1 μm to 34 μm, and the specific surface area was 0.4 m$^2$/g. Moreover, in Examples 15-1 to 15-12, the particle size of the cathode active material at a frequency of 50% in a particle size distribution curve was 13 μm, and the specific surface area was changed within a range from 0.01 m$^2$/g to 2 m$^2$/g as shown in Table 11. In addition, the ratio of zirconium to cobalt in the cathode active material was 0.01 mol %, and the molar ratio of lithium:cobalt:aluminum:magnesium, that is, a:x:y:z in Chemical Formula 1 was 1:0.989:0.01:0.001.

The initial charge/discharge efficiency, the initial discharge capacity, the load characteristics, the low-temperature characteristics and the cycle characteristics at 50° C. of the formed secondary batteries of the examples were determined as in the case of Example 1-1. Moreover, the volume density of the cathode active material layer 13B was measured. The results are shown in Tables 10 and 11. In addition, the initial discharge capacity is shown as a relative value in the case where the initial discharge capacity in Comparative Example 1-1 was 100.

TABLE 10

| PARTICLE SIZE AT FREQUENCY OF 50% (μm) | SPECIFIC SURFACE AREA (m$^2$/g) | INITIAL CHARGE/ DISCHARGE EFFICIENCY (%) | INITIAL DISCHARGE CAPACITY (RELATIVE VALUE) | VOLUME DENSITY (mg/cm$^3$) | LOAD CHARAC- TERISTICS (%) | LOW- TEMPERATURE CHARAC- TERISTICS (%) | 50° C. CHARAC- TERISTICS (%) |
|---|---|---|---|---|---|---|---|
| 1  | 0.4 | 93 | 99 | 1.8  | 99 | 77 | 82 |
| 2  |     | 93 | 99 | 1.9  | 99 | 77 | 82 |
| 4  |     | 93 | 99 | 1.95 | 99 | 77 | 82 |
| 5  |     | 93 | 99 | 2.9  | 98 | 75 | 82 |
| 8  |     | 93 | 99 | 3.1  | 97 | 73 | 82 |
| 13 |     | 93 | 99 | 3.3  | 95 | 71 | 82 |
| 20 |     | 93 | 99 | 3.4  | 94 | 70 | 82 |
| 26 |     | 93 | 99 | 3.6  | 93 | 68 | 82 |
| 30 |     | 93 | 99 | 3.7  | 91 | 67 | 82 |
| 31 |     | 93 | 99 | 4.05 | 65 | 41 | 82 |
| 34 |     | 93 | 99 | 4.2  | 61 | 38 | 82 |

TABLE 11

| PARTICLE SIZE AT FREQUENCY OF 50% (μm) | SPECIFIC SURFACE AREA (m$^2$/g) | INITIAL CHARGE/ DISCHARGE EFFICIENCY (%) | INITIAL DISCHARGE CAPACITY (RELATIVE VALUE) | VOLUME DENSITY (mg/cm$^3$) | LOAD CHARAC- TERISTICS (%) | LOW- TEMPERATURE CHARAC- TERISTICS (%) | 50° C. CHARAC- TERISTICS (%) |
|---|---|---|---|---|---|---|---|
| 13 | 0.01 | 93 | 99 | 3.3 | 66 | 42 | 90 |
|    | 0.05 | 93 | 99 | 3.3 | 68 | 43 | 88 |
|    | 0.09 | 93 | 99 | 3.3 | 69 | 45 | 86 |
|    | 0.1  | 93 | 99 | 3.3 | 90 | 66 | 84 |
|    | 0.3  | 93 | 99 | 3.3 | 93 | 68 | 83 |
|    | 0.4  | 93 | 99 | 3.3 | 95 | 71 | 82 |
|    | 0.6  | 93 | 99 | 3.3 | 96 | 72 | 80 |
|    | 0.9  | 93 | 99 | 3.3 | 97 | 73 | 79 |
|    | 1.1  | 93 | 99 | 3.3 | 98 | 75 | 77 |
|    | 1.5  | 93 | 99 | 3.3 | 99 | 77 | 76 |
|    | 1.6  | 93 | 99 | 3.3 | 96 | 72 | 50 |
|    | 1.8  | 93 | 99 | 3.3 | 97 | 73 | 45 |
|    | 2    | 93 | 99 | 3.3 | 98 | 75 | 40 |

As shown in Table 10, there was a tendency that as the particle size increased, the volume density increased, and the load characteristics and the low-temperature characteristics declined. Moreover, as shown in Table 11, there was a tendency that as the specific surface area increased, the load characteristics and the low-temperature characteristics were improved. In other words, it was found out that when the particle size of the cathode active material at a frequency of 50% in a particle size distribution curve was 30 μm or less,
and the specific surface area was 0.1 m²/g or more, higher effects could be obtained.

C. were determined by Formula 5 using the discharge capacity in the first cycle and the discharge capacity in the 500th cycle. The results are shown in Table 12 and FIG. 9. In addition, the initial discharge capacity is shown as a relative value in the case where the initial discharge capacity in Comparative Example 16-1 was 100.

Cycle characteristics at 23° C. (%)=(discharge capacity at 23° C. in the 500th cycle/discharge capacity at 23° C. in the first cycle)×100    (Formula 5)

TABLE 12

|  | Al COMPOSITION y | Mg COMPOSITION z | Zr/Co (mol %) | CONTENT OF γ-BUTYROLACTONE (WT %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|---|
| EXAMPLE 16-1 | 0.01 | 0.001 | 0.01 | 65 | 99 | 91 | 50 | 88 |
| EXAMPLE 16-2 |  |  | 0.05 |  | 97 | 90 | 49 | 85 |
| EXAMPLE 16-3 |  |  | 1.1 |  | 94 | 93 | 56 | 90 |
| EXAMPLE 16-4 |  |  | 2.0 |  | 97 | 95 | 58 | 92 |
| EXAMPLE 16-5 |  |  | 3.2 |  | 97 | 97 | 59 | 92 |
| EXAMPLE 16-6 |  |  | 4.1 |  | 97 | 88 | 48 | 83 |
| EXAMPLE 16-7 |  |  | 5.3 |  | 97 | 98 | 60 | 93 |
| EXAMPLE 16-8 |  |  | 6.1 |  | 97 | 90 | 58 | 86 |
| EXAMPLE 16-9 |  |  | 6.8 |  | 97 | 90 | 56 | 87 |
| EXAMPLE 16-10 |  |  | 7.5 |  | 96 | 88 | 58 | 85 |
| EXAMPLE 16-11 |  |  | 8.0 |  | 94 | 91 | 56 | 88 |
| EXAMPLE 16-12 |  |  | 9.0 |  | 91 | 88 | 50 | 92 |
| EXAMPLE 16-13 |  |  | 9.8 |  | 90 | 89 | 48 | 91 |
| COMPARATIVE EXAMPLE 16-1 | 0.01 | 0.001 | 0.0 | 65 | 100 | 55 | 30 | 50 |
| COMPARATIVE EXAMPLE 16-2 |  |  | 10.5 |  | 78 | 87 | 47 | 89 |
| COMPARATIVE EXAMPLE 16-3 |  |  | 12.0 |  | 73 | 85 | 45 | 86 |

Examples 16-1 to 16-13

Secondary batteries were formed as in the case of Examples 1-1 to 1-3, except that the gel electrolyte 16 in which polyvinylidene fluoride held an electrolytic solution formed by dissolving 1 mol/kg of $LiPF_6$ in a solvent formed by mixing 65 wt % of γ-butyrolactone and 35 wt % of ethylene carbonate was used. At that time, the ratio of zirconium to cobalt in the cathode active material was changed within a range from 0.01 mol % to 9.8 mol % as shown in Table 12, and the molar ratio of lithium:cobalt:aluminum:magnesium, that is, a:x:y:z in Chemical Formula 1 was 1:0.989:0.01:0.001.

Moreover, as Comparative Examples 16-1 to 16-3 relative to the examples, secondary batteries were formed as in the case of the examples, except that the ratio of zirconium to cobalt was changed as shown in Table 12.

The initial discharge capacity, the load characteristics and the low-temperature characteristics of the formed secondary batteries of the examples and the comparative examples were determined as in the case of Examples 1-1 to 1-3, and the cycle characteristics at 23° C. of the secondary batteries were determined. After the secondary batteries were charged at a constant current and a constant voltage at 23° C. under conditions that the upper limit voltage was 4.2 V and the current was 1 C until the total charge time reached 3 hours, the secondary batteries were discharged at a constant current at 23° C. under conditions that the current was 1 C and the end voltage was 3 V, and then the cycle characteristics at 23°

Figure 9:
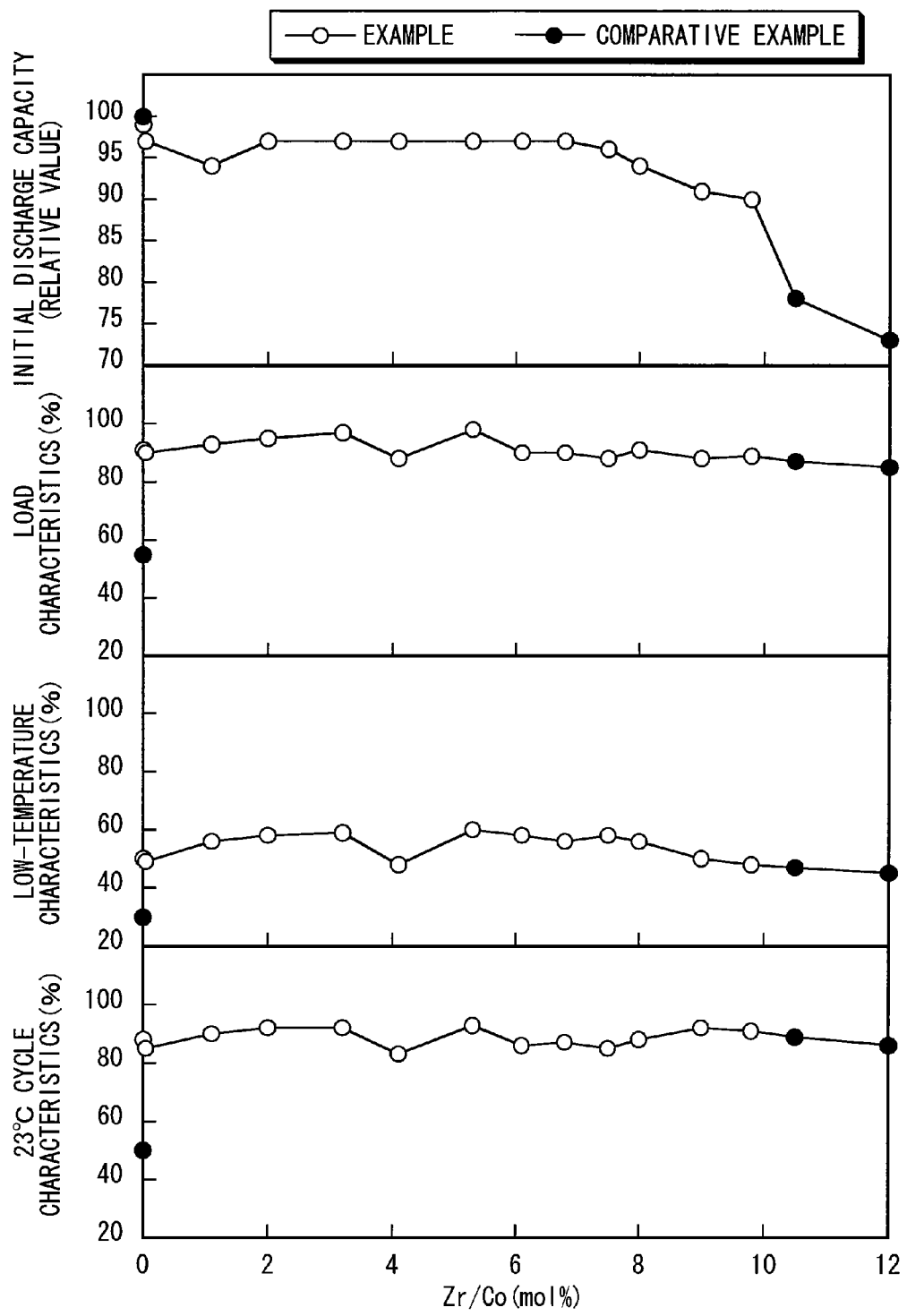
FIG. 9 is a plot showing a relationship between the content of zirconium, an initial discharge capacity, load characteristics, low-temperature characteristics and cycle characteristics at 23° C.

Polymer compound: polyvinylidene fluoride
Solvent: γ-butyrolactone+ethylene carbonate As shown in Table 12 and FIG. 9, there was a tendency that when the content of zirconium increased, the initial discharge capacity declined, and the load characteristics, the low-temperature characteristics and the cycle characteristics at 23° C. were improved, and then declined. In other words, it was found out that even if the cyclic carboxylate was used in the electrolyte, the load characteristics and the low-temperature characteristics could be improved, and the cycle characteristics could be improved.

Examples 17-1 to 17-6

Secondary batteries were formed as in the case of Example 16-1, except that the molar ratio y of aluminum or the molar ratio z of magnesium in the cathode active material was changed as shown in Table 13. In other words, as the electrolyte 16, a gel electrolyte in which polyvinylidene fluoride held an electrolytic solution formed by dissolving 1 mol/kg of $LiPF_6$ as an electrolyte salt in a solvent formed by mixing 65 wt % of γ-butyrolactone and 35 wt % of ethylene carbonate was used. Moreover, as Comparative Examples 17-1 to 17-8 relative to the examples, secondary batteries were formed as in the case of the examples, except that the molar ratio y of aluminum or the molar ratio z of magnesium was changed.

The initial charge/discharge efficiency, the initial discharge capacity, the load characteristics, the low-temperature characteristics and the cycle characteristics at 50° C. of the formed secondary batteries of the examples and the comparative examples were determined as in the case of Examples 1-1 to 1-3. The results are shown in Table 13 and FIG. 10. In addition, the initial discharge capacity is shown as a relative value in the case where the initial discharge capacity in Comparative Example 16-1 was 100.

TABLE 13

| | Al COMPOSITION y | Mg COMPOSITION z | Zr/Co (mol %) | CONTENT OF γ-BUTYROLACTONE (WT %) | INITIAL CHARGE/DISCHARGE EFFICIENCY (%) | INITIAL DISCHARGE CAPACITY (RELATIVE VALUE) | LOAD CHARACTERISTICS (%) | LOW-TEMPERATURE CHARACTERISTICS (%) | 50° C. CHARACTERISTICS (%) |
|---|---|---|---|---|---|---|---|---|---|
| EXAMPLE 17-1 | 0.01 | 0.001 | 0.01 | 65 | 93 | 99 | 91 | 50 | 88 |
| EXAMPLE 17-2 | | 0.01 | | | 93 | 99 | 91 | 50 | 91 |
| EXAMPLE 17-3 | | 0.05 | | | 93 | 99 | 91 | 50 | 93 |
| EXAMPLE 17-4 | 0.001 | 0.01 | 0.01 | | 94 | 99 | 91 | 50 | 88 |
| EXAMPLE 17-5 | 0.01 | | | | 93 | 99 | 91 | 50 | 91 |
| EXAMPLE 17-6 | 0.05 | | | | 91 | 99 | 91 | 50 | 93 |
| COMPARATIVE EXAMPLE 17-1 | 0.01 | 0 | 0.01 | 65 | 93 | 99 | 91 | 50 | 60 |
| COMPARATIVE EXAMPLE 17-2 | | 0.0005 | | | 93 | 99 | 91 | 50 | 63 |
| COMPARATIVE EXAMPLE 17-3 | | 0.06 | | | 93 | 99 | 91 | 50 | 63 |
| COMPARATIVE EXAMPLE 17-4 | | 0.07 | | | 93 | 99 | 91 | 50 | 62 |
| COMPARATIVE EXAMPLE 17-5 | 0 | 0.01 | 0.01 | | 97 | 99 | 91 | 50 | 60 |
| COMPARATIVE EXAMPLE 17-6 | 0.0005 | | | | 95 | 99 | 91 | 50 | 63 |
| COMPARATIVE EXAMPLE 17-7 | 0.06 | | | | 80 | 99 | 91 | 50 | 91 |
| COMPARATIVE EXAMPLE 17-8 | 0.07 | | | | 75 | 99 | 91 | 50 | 91 |

Polymer compound: polyvinylidene fluoride
Solvent: γ-butyrolactone+ethylene carbonate As shown in Table 13, there was a tendency that when the content of aluminum as the first element increased, the initial charge/discharge efficiency declined, and the cycle characteristics at 50° C. were improved, and there was a tendency that when the content of magnesium as the second element increased, the cycle characteristics at 50° C. was improved, then declined. In other words, it was found out that even if the cyclic carboxylate was used as the electrolyte, high-temperature characteristics could be improved.

Examples 18-1 to 18-5

Secondary batteries were formed as in the case of Example 16-3, except that the content of γ-butyrolactone in the solvent was changed as shown in Table 14. In other words, as the electrolyte 16, a gel electrolyte in which polyvinylidene fluoride held an electrolytic solution formed by dissolving 1 mol/kg of $LiPF_6$ as an electrolyte salt in a solvent formed by mixing γ-butyrolactone and ethylene carbonate was used. The ratio of zirconium to cobalt in the cathode active material was 1.1 mol %, and the molar ratio of lithium:cobalt:aluminum:magnesium, that is, a:x:y:z in Chemical Formula 1 was 1:0.989:0.01:0.001.

Moreover, as Comparative Examples 18-1 to 18-6 relative to the examples, secondary batteries were formed as in the case of Example 18-1 or 18-5, except that the ratio of zirconium to cobalt was changed as shown in Table 14.

The initial discharge capacity, the load characteristics, the low-temperature characteristics and the cycle characteristics at 23° C. of the formed secondary batteries of the examples and the comparative examples were determined as in the case of Example 16-3. The results are shown in Table 14 together with the results of Example 16-3 and Comparative Examples 16-1 to 16-3. In addition, the initial discharge capacity is shown as a relative value in the case where the initial discharge capacity in Comparative Example 16-1 was 100.

TABLE 14

| | Al COMPOSITION y | Mg COMPOSITION z | Zr/Co (mol %) | CONTENT OF γ-BUTYROLACTONE (WT %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|---|
| EXAMPLE 18-1 | 0.01 | 0.001 | 1.1 | 20 | 94 | 89 | 50 | 93 |
| EXAMPLE 18-2 | | | | 45 | 94 | 91 | 53 | 91 |
| EXAMPLE 18-3 | | | | 55 | 94 | 93 | 56 | 91 |
| EXAMPLE 16-3 | | | | 65 | 94 | 94 | 57 | 90 |
| EXAMPLE 18-4 | | | | 80 | 94 | 94 | 58 | 88 |
| EXAMPLE 18-5 | | | | 95 | 94 | 96 | 60 | 84 |
| COMPARATIVE EXAMPLE 18-1 | 0.01 | 0.001 | 0.0 | 20 | 99 | 51 | 15 | 90 |
| COMPARATIVE EXAMPLE 18-2 | | | 10.5 | | 78 | 84 | 15 | 91 |
| COMPARATIVE EXAMPLE 18-3 | | | 12.0 | | 73 | 81 | 17 | 94 |
| COMPARATIVE EXAMPLE 16-1 | | | 0.0 | 65 | 100 | 55 | 30 | 50 |

TABLE 14-continued

| | Al COMPOSITION y | Mg COMPOSITION z | Zr/Co (mol %) | CONTENT OF γ-BUTYROLACTONE (WT %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|---|
| COMPARATIVE EXAMPLE 16-2 | | | 10.5 | | 78 | 87 | 50 | 89 |
| COMPARATIVE EXAMPLE 16-3 | | | 12.0 | | 73 | 85 | 48 | 86 |
| COMPARATIVE EXAMPLE 18-4 | | | 0.0 | 95 | 99 | 60 | 32 | 20 |
| COMPARATIVE EXAMPLE 18-5 | | | 10.5 | | 78 | 90 | 52 | 53 |
| COMPARATIVE EXAMPLE 18-6 | | | 12.0 | | 73 | 95 | 55 | 54 |

Polymer compound: polyvinylidene fluoride
Solvent: γ-butyrolactone+ethylene carbonate value in the case where the initial discharge capacity in Comparative Example 19-1 was 100.

TABLE 15

| | Al COMPOSITION y | Mg COMPOSITION z | Zr/Co (mol %) | CONTENT OF γ-VALEROLACTONE (WT %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|---|
| EXAMPLE 19-1 | 0.01 | 0.001 | 1.1 | 65 | 94 | 94 | 58 | 92 |
| COMPARATIVE EXAMPLE 19-1 | 0.01 | 0.001 | 0.0 | 65 | 100 | 58 | 35 | 55 |
| COMPARATIVE EXAMPLE 19-2 | | | 10.5 | | 78 | 90 | 55 | 92 |
| COMPARATIVE EXAMPLE 19-3 | | | 12.0 | | 73 | 88 | 53 | 89 |

As shown in Table 14, even if the content of γ-butyrolactone was changed, the load characteristics, the low-temperature characteristics and the cycle characteristics at 23° C. could be improved. Moreover, there was a tendency that when the content of γ-butyrolactone increased, the load characteristics and the low-temperature characteristics were improved, and the cycle characteristics at 23° C. declined. In other words, it was found out that the content of the cyclic carboxylate in the solvent was preferably 20 wt % or more.

Example 19-1

A secondary battery was formed as in the case of Example 16-3, except that instead of γ-butyrolactone, γ-valerolactone was used. In other words, as the electrolyte 16, a gel electrolyte in which polyvininylidene fluoride held an electrolytic solution formed by dissolving 1 mol/kg of $LiPF_6$ as an electrolyte salt in a solvent formed by mixing 65 wt % of γ-valerolactone and 35 wt % of ethylene carbonate was used. The ratio of zirconium to cobalt in the cathode active material was 1.1 mol %, and the molar ratio of lithium:cobalt:aluminum:magnesium, that is, a:x:y:z in Chemical Formula 1 was 1:0.989:0.01:0.001.

Moreover, as Comparative Examples 19-1 to 19-3 relative to the example, secondary batteries were formed as in the case of Example 19-1, except that the ratio of zirconium to cobalt was changed as shown in Table 15.

The initial discharge capacity, the load characteristics, the low-temperature characteristics and the cycle characteristics at 23° C. of the formed secondary batteries of the example and the comparative examples were determined as in the case of Example 16-3. The results are shown in Table 15. In addition, the initial discharge capacity is shown as a relative Polymer compound: polyvinylidene fluoride
Solvent: γ-valerolactone+ethylene carbonate As shown in Table 15, even if γ-valerolactone was used, the load characteristics, the low-temperature characteristics and the cycle characteristics at 23° C. could be improved. In other words, it was found out that even if another cyclic carboxylate was used, the same effects could be obtained.

Examples 20-1 to 20-3

Secondary batteries were formed as in the case of Example 16-3, except that the polymer compound in the electrolyte 16 was changed as shown in Table 16. In other words, as the electrolyte 16, a gel electrolyte in which the polymer compound held an electrolytic solution formed by dissolving 1 mol/kg of $LiPF_6$ as an electrolyte salt in a solvent formed by mixing 65 wt % of γ-butyrolactone and 35 wt % of ethylene carbonate was used. The ratio of zirconium to cobalt in the cathode active material was 1.1 mol %, and the molar ratio of lithium:cobalt:aluminum:magnesium, that is, a:x:y:z in Chemical Formula 1 was 1:0.989:0.01:0.001.

The initial discharge capacity, the load characteristics, the low-temperature characteristics and the cycle characteristics at 23° C. of the formed secondary batteries of the examples were determined as in the case of Example 16-3. The results are shown in Table 16. In addition, the initial discharge capacity is shown as a relative value in the case where the initial discharge capacity in Comparative Example 16-1 was 100.

TABLE 16

| | POLYMER COMPOUND | CONTENT OF γ-BUTYROLACTONE (WT %) | Zr/Co (mol %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|
| EXAMPLE 16-3 | polyvinylidene fluoride | 65 | 1.1 | 94 | 93 | 56 | 90 |
| EXAMPLE 20-1 | polyethylene oxide | | 1.1 | 94 | 93 | 56 | 90 |
| EXAMPLE 20-2 | polymethylmethacrylate | | 1.1 | 94 | 93 | 56 | 90 |
| EXAMPLE 20-3 | polyacrylonitrile | | 1.1 | 94 | 93 | 56 | 90 |

As shown in Table 16, even if another polymer compound was used, the same effects could be obtained. In other words, it was found out that even if another polymer compound was used in the electrolyte 16, the same effects could be obtained.

Examples 21-1 to 21-12, 22-1 to 22-12, 23-1 to 23-6, 24-1 to 24-6, 25-1 to 25-18

Secondary batteries were formed as in the case of Example 16-1, except that another cathode active material was mixed and used with the cathode active material according to the invention. In other words, as the electrolyte 16, a gel electrolyte in which the polymer compound held an electrolytic solution formed by dissolving 1 mol/kg of $LiPF_6$ as an electrolyte salt in a solvent formed by mixing 65 wt % of γ-butyrolactone and 35 wt % of ethylene carbonate was used. The ratio of zirconium to cobalt in the cathode active material according to the invention was 0.01 mol %, and the molar ratio of lithium:cobalt:aluminum:magnesium, that is, a:x:y:z in Chemical Formula was 1:0.989:0.01:0.001.

As another cathode active material, in Examples 21-1 to 21-6, $LiNi_{0.40}Co_{0.30}Mn_{0.30}O_2$ and $LiMn_2O_4$ were used, in Examples 21-7 to 21-12, $LiNi_{0.20}Co_{0.40}Mn_{0.40}O_2$ was used, in Examples 22-1 to 22-6, $LiNi_{0.59}Co_{0.40}Al_{0.01}O_2$ and $LiMn_2O_4$ were used, in Examples 22-7 to 22-12, $LiNi_{0.50}Co_{0.50}O_2$ was used, in Examples 23-1 to 23-6, $LiNi_{0.40}Co_{0.30}Mn_{0.30}O_2$ and $LiFePO_4$ were used, in Examples 24-1 to 24-6, $LiNi_{0.59}Co_{0.40}Al_{0.01}O_2$ and $LiFePO_4$ were used, and in Examples 25-1 to 25-18, $LiMn_2O_4$ and $LiFePO_4$ were used, or one of them was used. Moreover, the mixture ratio of the cathode active materials was changed as shown in Tables 17 to 21 in each of the examples.

As Comparative Examples 21-1, 21-2, 22-1, 22-2, 23-1, 24-1, and 25-1 to 25-3 relative to the examples, secondary batteries were formed as in the case of the examples, except that the cathode active material according to the invention was not used.

The initial discharge capacity, the load characteristics, the low-temperature characteristics and the cycle characteristics at 23° C. of the formed secondary batteries of the examples and the comparative examples were determined as in the case of Example 16-1. The results are shown in Tables 17 to 21 together with the results of Example 16-1. In addition, the initial discharge capacity is shown as a relative value in the case where the initial discharge capacity in Comparative Example 16-1 was 100.

TABLE 17

| | CATHODE ACTIVE MATERIAL (WT %) | | | | CONTENT OF γ-BUTYROLACTONE (WT %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|---|---|
| | A | B | C | $LiMn_2O_4$ | | | | | |
| EXMAPLE 21-1 | 3 | 37 | 0 | 60 | 65 | 99 | 55 | 28 | 88 |
| EXMAPLE 21-2 | 8 | 42 | 0 | 50 | | 99 | 63 | 31 | 88 |
| EXMAPLE 21-3 | 10 | 50 | 0 | 40 | | 99 | 82 | 50 | 88 |
| EXMAPLE 21-4 | 30 | 30 | 0 | 40 | | 99 | 86 | 62 | 88 |
| EXMAPLE 21-5 | 50 | 20 | 0 | 30 | | 99 | 88 | 65 | 88 |
| EXMAPLE 21-6 | 80 | 10 | 0 | 10 | | 99 | 90 | 68 | 88 |
| EXMAPLE 21-7 | 3 | 0 | 97 | 0 | | 99 | 55 | 28 | 88 |
| EXMAPLE 21-8 | 8 | 0 | 92 | 0 | | 99 | 63 | 31 | 88 |
| EXMAPLE 21-9 | 10 | 0 | 90 | 0 | | 99 | 82 | 50 | 88 |
| EXMAPLE 21-10 | 30 | 0 | 70 | 0 | | 99 | 86 | 62 | 88 |
| EXMAPLE 21-11 | 50 | 0 | 50 | 0 | | 99 | 88 | 65 | 88 |
| EXMAPLE 21-12 | 80 | 0 | 20 | 0 | | 99 | 90 | 68 | 88 |
| EXMAPLE 16-1 | 100 | 0 | 0 | 0 | | 99 | 91 | 50 | 88 |
| COMPARATIVE EXMPLE 21-1 | 0 | 40 | 0 | 60 | 65 | 99 | 40 | 18 | 88 |

TABLE 17-continued

|  | CATHODE ACTIVE MATERIAL (WT %) | | | | CONTENT OF γ-BUTYROLACTONE (WT %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|---|---|
|  | A | B | C | LiMn$_2$O$_4$ | | | | | |
| COMPARATIVE EXMPLE 21-2 | 0 | 0 | 100 | 0 | | 99 | 40 | 18 | 88 |

Cathode active material
A: LiCo$_{0.989}$Al$_{0.01}$Mg$_{0.001}$O$_2$ + Zr (0.01 mol %)
B: LiNi$_{0.40}$Co$_{0.30}$Mn$_{0.30}$O$_2$
C: LiNi$_{0.20}$Co$_{0.40}$Mn$_{0.40}$O$_2$

TABLE 18

|  | CATHODE ACTIVE MATERIAL (WT %) | | | | CONTENT OF γ-BUTYROLACTONE (WT %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|---|---|
|  | A | D | E | LiMn$_2$O$_4$ | | | | | |
| EXMAPLE 22-1 | 3 | 40 | 0 | 57 | 65 | 99 | 55 | 28 | 88 |
| EXMAPLE 22-2 | 8 | 25 | 0 | 67 | | 99 | 63 | 31 | 88 |
| EXMAPLE 22-3 | 10 | 40 | 0 | 50 | | 99 | 82 | 50 | 88 |
| EXMAPLE 22-4 | 30 | 30 | 0 | 40 | | 99 | 86 | 62 | 88 |
| EXMAPLE 22-5 | 50 | 30 | 0 | 20 | | 99 | 88 | 65 | 88 |
| EXMAPLE 22-6 | 80 | 5 | 0 | 15 | | 99 | 90 | 68 | 88 |
| EXMAPLE 22-7 | 3 | 0 | 97 | 0 | | 99 | 55 | 28 | 88 |
| EXMAPLE 22-8 | 8 | 0 | 92 | 0 | | 99 | 63 | 31 | 88 |
| EXMAPLE 22-9 | 10 | 0 | 90 | 0 | | 99 | 82 | 50 | 88 |
| EXMAPLE 22-10 | 30 | 0 | 70 | 0 | | 99 | 86 | 62 | 88 |
| EXMAPLE 22-11 | 50 | 0 | 50 | 0 | | 99 | 88 | 65 | 88 |
| EXMAPLE 22-12 | 80 | 0 | 20 | 0 | | 99 | 90 | 68 | 88 |
| EXMAPLE 16-1 | 100 | 0 | 0 | 0 | | 99 | 91 | 50 | 88 |
| COMPARATIVE EXMPLE 22-1 | 0 | 60 | 0 | 40 | 65 | 99 | 40 | 18 | 88 |
| COMPARATIVE EXMPLE 22-2 | 0 | 0 | 100 | 0 | | 99 | 40 | 18 | 88 |

Cathode active material
A: LiCo$_{0.989}$Al$_{0.01}$Mg$_{0.001}$O$_2$ + Zr (0.01 mol %)
D: LiNi$_{0.59}$Co$_{0.40}$Al$_{0.01}$O$_2$
E: LiNi$_{0.50}$Co$_{0.50}$O$_2$

45

TABLE 19

|  | CATHODE ACTIVE MATERIAL (WT %) | | | CONTENT OF γ-BUTYROLACTONE (WT %) | INITIAL DISCHARGE CAPACITY (RELATIVE VALUE) | LOAD CHARACTERISTICS (%) | LOW-TEMPERATURE CHARACTERISTICS (%) | 23° C. CHARACTERISTICS (%) |
|---|---|---|---|---|---|---|---|---|
|  | A | B | LiFePO$_4$ | | | | | |
| EXMAPLE 23-1 | 3 | 37 | 60 | 65 | 99 | 55 | 28 | 88 |
| EXMAPLE 23-2 | 8 | 42 | 50 | | 99 | 63 | 31 | 88 |
| EXMAPLE 23-3 | 10 | 50 | 40 | | 99 | 82 | 50 | 88 |
| EXMAPLE 23-4 | 30 | 30 | 40 | | 99 | 86 | 62 | 88 |
| EXMAPLE 23-5 | 50 | 20 | 30 | | 99 | 88 | 65 | 88 |
| EXMAPLE 23-6 | 80 | 10 | 10 | | 99 | 90 | 68 | 88 |
| EXMAPLE 16-1 | 100 | 0 | 0 | | 99 | 91 | 50 | 88 |
| COMPARATIVE EXMPLE 23-1 | 0 | 40 | 60 | 65 | 99 | 40 | 18 | 88 |

Cathode active material
A: LiCo$_{0.989}$Al$_{0.01}$Mg$_{0.001}$O$_2$ + Zr (0.01 mol %)
B: LiNi$_{0.40}$Co$_{0.30}$Mn$_{0.30}$O$_2$

TABLE 20

| | CATHODE ACTIVE MATERIAL (WT %) | | | CONTENT OF γ-BUTYROLACTONE | INITIAL DISCHARGE CAPACITY (RELATIVE | LOAD CHARACTERISTICS | LOW-TEMPERATURE CHARACTERISTICS | 23° C. CHARACTERISTICS |
|---|---|---|---|---|---|---|---|---|
| | A | D | LiFePO$_4$ | (WT %) | VALUE) | (%) | (%) | (%) |
| EXMAPLE 24-1 | 3 | 40 | 57 | 65 | 99 | 55 | 28 | 88 |
| EXMAPLE 24-2 | 8 | 25 | 67 | | 99 | 63 | 31 | 88 |
| EXMAPLE 24-3 | 10 | 40 | 50 | | 99 | 82 | 50 | 88 |
| EXMAPLE 24-4 | 30 | 30 | 40 | | 99 | 86 | 62 | 88 |
| EXMAPLE 24-5 | 50 | 30 | 20 | | 99 | 88 | 65 | 88 |
| EXMAPLE 24-6 | 80 | 5 | 15 | | 99 | 90 | 68 | 88 |
| EXMAPLE 16-1 | 100 | 0 | 0 | | 99 | 91 | 50 | 88 |
| COMPARATIVE EXMPLE 24-1 | 0 | 60 | 40 | 65 | 99 | 40 | 18 | 88 |

Cathode active material
A: LiCo$_{0.989}$Al$_{0.01}$Mg$_{0.001}$O$_2$ + Zr (0.01 mol %)
D: LiNi$_{0.59}$Co$_{0.40}$Al$_{0.01}$O$_2$

TABLE 21

| | CATHODE ACTIVE MATERIAL (WT %) | | | CONTENT OF γ-BUTYROLACTONE | INITIAL DISCHARGE CAPACITY (RELATIVE | LOAD CHARACTERISTICS | LOW-TEMPERATURE CHARACTERISTICS | 23° C. CHARACTERISTICS |
|---|---|---|---|---|---|---|---|---|
| | A | LiMn$_2$O$_4$ | LiFePO$_4$ | (WT %) | VALUE) | (%) | (%) | (%) |
| EXMAPLE 25-1 | 3 | 37 | 60 | 65 | 99 | 55 | 28 | 88 |
| EXMAPLE 25-2 | 8 | 42 | 50 | | 99 | 63 | 31 | 88 |
| EXMAPLE 25-3 | 10 | 50 | 40 | | 99 | 82 | 50 | 88 |
| EXMAPLE 25-4 | 30 | 30 | 40 | | 99 | 86 | 62 | 88 |
| EXMAPLE 25-5 | 50 | 20 | 30 | | 99 | 88 | 65 | 88 |
| EXMAPLE 25-6 | 80 | 10 | 10 | | 99 | 90 | 68 | 88 |
| EXMAPLE 25-7 | 3 | 97 | 0 | | 99 | 55 | 28 | 88 |
| EXMAPLE 25-8 | 8 | 92 | 0 | | 99 | 63 | 31 | 88 |
| EXMAPLE 25-9 | 10 | 90 | 0 | | 99 | 82 | 50 | 88 |
| EXMAPLE 25-10 | 30 | 70 | 0 | | 99 | 86 | 62 | 88 |
| EXMAPLE 25-11 | 50 | 50 | 0 | | 99 | 88 | 65 | 88 |
| EXMAPLE 25-12 | 80 | 20 | 0 | | 99 | 90 | 68 | 88 |
| EXMAPLE 25-13 | 3 | 0 | 97 | | 99 | 55 | 28 | 88 |
| EXMAPLE 25-14 | 8 | 0 | 92 | | 99 | 63 | 31 | 88 |
| EXMAPLE 25-15 | 10 | 0 | 90 | | 99 | 82 | 50 | 88 |
| EXMAPLE 25-16 | 30 | 0 | 70 | | 99 | 86 | 62 | 88 |
| EXMAPLE 25-17 | 50 | 0 | 50 | | 99 | 88 | 65 | 88 |
| EXMAPLE 25-18 | 80 | 0 | 20 | | 99 | 90 | 68 | 88 |
| EXMAPLE 16-1 | 100 | 0 | 0 | | 99 | 91 | 50 | 88 |
| COMPARATIVE EXMPLE 25-1 | 0 | 40 | 60 | 65 | 99 | 40 | 18 | 88 |
| COMPARATIVE EXMPLE 25-2 | 0 | 100 | 0 | | 99 | 40 | 18 | 88 |
| COMPARATIVE EXMPLE 25-3 | 0 | 0 | 100 | | 99 | 40 | 18 | 88 |

Cathode active material
A: LiCo$_{0.989}$Al$_{0.01}$Mg$_{0.001}$O$_2$ + Zr (0.01 mol %)

As shown in Tables 17 to 21, in each of the examples in which the cathode active material according to the invention was used, the load characteristics and the low-temperature characteristics could be improved, compared to each of the comparative examples in which the cathode active material according to the invention was not used. Moreover, there was a tendency that the more the ratio of the cathode active material according to the invention increased, the more they were improved. In other words, it was found out that even if another cathode active material was mixed and used with the cathode active material according to the invention, effects could be obtained, and when the ratio of the cathode active material according to the invention in the whole cathode active material was 10 wt % or more, higher effects could be obtained.

Examples 26-1 to 26-3, 27-1 to 27-3

Secondary batteries were formed by adjusting the amounts of the cathode active material and the anode active material so that the open circuit voltage in a fully charged state became 4.2 V, 4.35V or 4.5 V. At that time, in Examples 26-1 to 26-3, the secondary batteries where formed as in the case of Example 1-1, except that the ratio of zirconium to cobalt in the cathode active material was 0.01 mol %, and the molar ratio of lithium:cobalt:aluminum:magnesium, that is, a:x:y:z in Chemical Formula 1 was 1:0.98:0.01:0.01. In other words, as the electrolyte, an electrolytic solution formed by dissolving 1 mol/kg of LiPF$_6$ as an electrolyte salt in a solvent formed by mixing ethylene carbonate and ethyl methyl carbonate at a weight ratio of 1:1 was used. The open circuit voltage in a fully charged state was 4.2 V in Example 26-1, 4.35 V in Example 26-2, and 4.5 V in Example 26-3.

In Examples 27-1 to 27-3, the secondary batteries were formed as in the case of Example 16-1, except that the ratio of zirconium to cobalt in the cathode active material was 0.01 mol %, and the molar ratio of lithium:cobalt:aluminum:magnesium, that is, a:x:y:z in Chemical Formula 1 was 1:0.98:0.01:0.01. In other words, as the electrolyte 16, a gel electrolyte in which polyvininylidene fluoride held an electrolytic solution formed by dissolving 1 mol/kg of $LiPF_6$ as an electrolyte salt in a solvent formed by mixing 65 wt % of γ-butyrolactone and 35 wt % of ethylene carbonate was used. The open circuit voltage in a fully charged state was 4.2 V in Example 27-1, 4.35 V in Example 27-2, and 4.5 V in Example 27-3.

Moreover, as Comparative Examples 26-1 to 26-9 and 27-1 to 27-9 relative to the examples, secondary batteries were formed as in the case of Examples 26-1 to 26-3 or Examples 27-1 to 27-3, except that the molar ratio y of aluminum, the molar ratio z of magnesium, or the ratio of zirconium to cobalt was changed as shown in Tables 22 and 23. The open circuit voltage in a fully charged state was 4.2 V in Comparative Examples 26-1, 26-4, 26-7, 27-1, 27-4 and 27-7, 4.35 V in Comparative Examples 26-2, 26-5, 26-8, 27-2, 27-5 and 27-8, and 4.5 V in Comparative Examples 26-3, 26-6, 26-9, 27-3, 27-6 and 27-9.

The cyclic characteristics at 23° C. and the cycle characteristics at 50° C. of the formed secondary batteries of the examples and the comparative examples were determined as in the case of Examples 1-1 and 16-1. At that time, the upper limit voltage during charge was the open circuit voltage in a fully charged state, and was changed to 4.2 V, 4.3V or 4.5 V. The results are shown in Tables 22 and 23.

TABLE 22

| | Al COMPOSITION y | Mg COMPOSITION z | Zr/Co (mol %) | UPPER LIMIT CHARGE VOLTAGE (V) | CYCLE CHARACTERISTICS (%) 23° C. 500 CYCLE | CYCLE CHARACTERISTICS (%) 50° C. 300 CYCLE |
|---|---|---|---|---|---|---|
| EXAMPLE 26-1 | 0.01 | 0.01 | 0.01 | 4.2 | 85 | 84 |
| EXAMPLE 26-2 | | | | 4.35 | 82 | 80 |
| EXAMPLE 26-3 | | | | 4.5 | 80 | 78 |
| COMPARATIVE EXAMPLE 26-1 | 0 | 0.01 | 0.01 | 4.2 | 74 | 71 |
| COMPARATIVE EXAMPLE 26-2 | | | | 4.35 | 60 | 40 |
| COMPARATIVE EXAMPLE 26-3 | | | | 4.5 | 55 | 30 |
| COMPARATIVE EXAMPLE 26-4 | 0.01 | 0 | 0.01 | 4.2 | 74 | 71 |
| COMPARATIVE EXAMPLE 26-5 | | | | 4.35 | 63 | 42 |
| COMPARATIVE EXAMPLE 26-6 | | | | 4.5 | 58 | 33 |
| COMPARATIVE EXAMPLE 26-7 | 0.01 | 0.01 | 0 | 4.2 | 80 | 78 |
| COMPARATIVE EXAMPLE 26-8 | | | | 4.35 | 65 | 45 |
| COMPARATIVE EXAMPLE 26-9 | | | | 4.5 | 60 | 35 |

Solvent; ethylene carbonate+ethyl methyl carbonate

TABLE 23

| | Al COMPOSITION y | Mg COMPOSITION z | Zr/Co (mol %) | UPPER LIMIT CHARGE VOLTAGE (V) | CYCLE CHARACTERISTICS (%) 23° C. 500 CYCLE | CYCLE CHARACTERISTICS (%) 50° C. 300 CYCLE |
|---|---|---|---|---|---|---|
| EXAMPLE 27-1 | 0.01 | 0.01 | 0.01 | 4.2 | 93 | 91 |
| EXAMPLE 27-2 | | | | 4.35 | 82 | 87 |
| EXAMPLE 27-3 | | | | 4.5 | 76 | 84 |
| COMPARATIVE EXAMPLE 27-1 | 0 | 0.01 | 0.01 | 4.2 | 93 | 75 |
| COMPARATIVE EXAMPLE 27-2 | | | | 4.35 | 60 | 40 |
| COMPARATIVE EXAMPLE 27-3 | | | | 4.5 | 55 | 30 |
| COMPARATIVE EXAMPLE 27-4 | 0.01 | 0 | 0.01 | 4.2 | 93 | 75 |
| COMPARATIVE EXAMPLE 27-5 | | | | 4.35 | 63 | 42 |
| COMPARATIVE EXAMPLE 27-6 | | | | 4.5 | 58 | 33 |

TABLE 23-continued

| | Al COMPOSITION y | Mg COMPOSITION z | Zr/Co (mol %) | UPPER LIMIT CHARGE VOLTAGE (V) | CYCLE CHARACTERISTICS (%) | |
|---|---|---|---|---|---|---|
| | | | | | 23° C. 500 CYCLE | 50° C. 300 CYCLE |
| COMPARATIVE EXAMPLE 27-7 | 0.01 | 0.01 | 0 | 4.2 | 90 | 80 |
| COMPARATIVE EXAMPLE 27-8 | | | | 4.35 | 65 | 45 |
| COMPARATIVE EXAMPLE 27-9 | | | | 4.5 | 60 | 35 |

Polymer compound; polyvinylidene fluoride
Solvent; γ-butyrolactone (65 wt %)+ethylene carbonate (35 wt %)

As shown in Tables 22 and 23, in the examples, compared to the comparative examples, the cycle characteristics could be improved. In other words, it was found out that when the cathode active material according to the invention was used, even if the battery voltage was increased, superior characteristics could be obtained.

Although the present invention is described referring to the embodiment and the examples, the invention is not limited to the embodiment and the examples, and can be variously modified. For example, in the above-described embodiment and the above-described examples, the case where as the electrolyte 16, the electrolytic solution or the gel electrolyte is used is described; however, any other electrolyte may be used. Examples of the other electrolyte include a solid electrolyte having ionic conductivity, a mixture of a solid electrolyte and an electrolytic solution and a mixture of a solid electrolyte and a gel electrolyte.

As the solid electrolyte, for example, a polymer solid electrolyte formed by dispersing an electrolyte salt in a polymer compound having ionic conductivity, or an inorganic solid electrolyte made of ionic conducting glass, ionic crystal or the like can be used. As the polymer compound in the polymer solid electrolyte, for example, an ether-based polymer compound such as polyethylene oxide or a cross-link including polyethylene oxide, an ester-based polymer compound such as polymethacrylate, an acrylate-based polymer compound, a mixture thereof, or a copolymer thereof can be used. Moreover, as the inorganic solid electrolyte, an inorganic solid electrolyte including lithium nitride, lithium phosphate or the like can be used.

Moreover, in the above-described embodiment and the above-described examples, a so-called lithium-ion secondary battery in which the capacity of the anode is represented by a capacity component by insertion and extraction of lithium is described; however, the invention applicable to a so-called lithium metal secondary battery in which lithium metal is used as an anode active material, and the capacity of an anode is represented by a capacity component by precipitation and dissolution of lithium, and a secondary battery in which the charge capacity of an anode material capable of inserting and extracting lithium is smaller than the charge capacity of a cathode, thereby the capacity of the anode includes a capacity component by insertion and extraction of lithium and a capacity component by precipitation and dissolution of lithium, and is represented by the sum of them in the same manner.

Moreover, in the above-described embodiment and the above-described examples, the case where the battery element 10 is spirally wound is described; however, the invention is applicable to the case of including a card-type battery element in which a cathode and an anode are laminated with a separator and an electrolyte in between, the case of including a laminate-type battery element in which two or more cathodes and two or more anodes are alternately laminated with a separator and an electrolyte, or the case of including a battery element in which a cathode and an anode are laminated with a separator and an electrolyte layer, and are z-folded.

Further, in the above-described embodiment and the above-described examples, the case where the film-shaped package member 21 is used is described; however, the invention is applicable to a cylindrical type, a prismatic type, a coin type or a button type secondary battery using a package member made of a metal container. In this case, the same effects can be obtained. In addition, the invention is applicable to not only secondary batteries but also primary batteries.

The invention claimed is:

1. A cathode active material comprising:
   a lithium cobalt complex oxide including lithium (Li), cobalt (Co), a first element, a second element, and sub-component compound,
   wherein,
   the first element is at least one kind selected from the group consisting of aluminum (Al), chromium (Cr), vanadium (V), manganese (Mn), and iron (Fe), the second element is at least one kind selected from the group consisting of magnesium (Mg) and calcium (Ca),
   the molar ratios of cobalt, the first element and the second element in the lithium cobalt complex oxide are within ranges of $0.9 \leq x < 1$, $0.001 \leq y \leq 0.05$, and $0.001 \leq z \leq 0.05$, respectively, providing that the composition of cobalt is x, the composition of the first element is y, and the composition of the second element is z,
   the sub-component compound includes zirconium (Zr) and at least a part of the Zr of the sub-component compound is present in a crystal grain boundary of the lithium cobalt complex oxide,
   the content of zirconium is within a range from 0.01 mol % to 10 mol % both inclusive as a ratio (Zr/Co) of zirconium to cobalt in lithium cobalt complex oxide, and
   the lithium cobalt complex oxide is represented by Chemical Formula 1:

wherein, MI represents the first element, MII represents the second element, the values of a, x, y and z are within ranges of $0.9 \leq a \leq 1.1$, $0.9 \leq x < 1$, $0.001 \leq y \leq 0.05$, and $0.001 \leq z \leq 0.05$, and $x+y+z=1$.

2. The cathode active material according to claim 1, wherein the particle size at a frequency of 50% in a particle size distribution curve is within a range from 5/μm to 30/μm both inclusive, and the specific surface area is within a range from 0.1 m²/g to 1.5 m²/g both inclusive.

3. The cathode active material according to claim 1, wherein the zirconium of the sub-component compound present in the crystal grain boundary comprises zirconium oxide.

4. The cathode active material according to claim 1, wherein the zirconium of the sub-component compound present in the crystal grain boundary comprises lithium zirconate.

5. The cathode active material according to claim 1, wherein the at least a part of the zirconium of the sub-component compound is encased within the cathode active material particle.

6. The cathode active material according to claim 1, wherein a first portion of the at least a part of the zirconium of the sub-component compound is present on the surface of the cathode active material particle and a second portion of the at least a part of the zirconium of the sub-component compound is encased within the cathode active material particle.

7. The cathode active material according to claim 1, wherein the at least a part of the zirconium of the sub-component compound is present in the crystal grain boundary of the lithium cobalt complex oxide and is located in a border area between a set of crystals of the lithium cobalt complex oxide.

8. The cathode active material according to claim 1, wherein the zirconium and the cobalt are a coprecipitated compound present in the solid solution.

9. A battery comprising a cathode, an anode, and an electrolyte,
wherein,
the cathode includes a cathode active material including a lithium cobalt complex oxide,
the lithium cobalt complex oxide includes lithium (Li), cobalt (Co), a first element, a second element, and a sub-component compound,
the first element is at least one kind selected from the group consisting of aluminum (Al), chromium (Cr), vanadium (V), manganese (Mn), and iron (Fe),
the second element is at least one kind selected from the group consisting of magnesium (Mg), and calcium (Ca),
the molar ratios of cobalt, the first element and the second element in the lithium cobalt complex oxide are within ranges of $0.9 \leq x < 1$, $0.001 \leq y \leq 0.05$, and $0.001 \leq z \leq 0.05$, respectively, providing that the composition of cobalt is x, the composition of the first element is y, and the composition of the second element is z,
the sub-component compound includes zirconium (Zr) and at least a part of the Zr of the sub-component compound is present in a crystal grain boundary of the lithium cobalt complex oxide,
the content of zirconium is within a range from 0.01 mol % to 10 mol % both inclusive as a ratio (Zr/Co) of zirconium to cobalt in lithium cobalt complex oxide, and
the lithium cobalt complex oxide is represented by Chemical Formula 1:

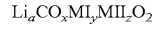

wherein, MI represents the first element, MII represents the second element, the values of a, x, y and z are within ranges of $0.9 \leq a \leq 1.1$, $0.9 \leq x < 1$, $0.001 \leq y \leq 0.05$, and $0.001 \leq z \leq 0.05$, and $x+y+z=1$.

10. The battery according to claim 9, wherein the particle size of the cathode active material at a frequency of 50% in a particle size distribution curve is within a range from 5/μm to 30/μm both inclusive, and the specific surface area of the cathode active material is within a range from 0.1 m²/g to 1.5 m²/g both inclusive.

11. The battery according to claim 9, wherein the electrolyte includes a cyclic carboxylate.

12. The battery according to claim 9, wherein the open circuit voltage in a fully charged state per a pair of the cathode and the anode is within a range from 4.25 V to 6.00 V both inclusive.

13. The battery according to claim 9, wherein the zirconium of the sub-component compound present in the crystal grain boundary comprises zirconium oxide.

14. The battery according to claim 9, wherein the zirconium of the sub-component compound present in the crystal grain boundary comprises lithium zirconate.

* * * * *